(12) United States Patent
Pihan et al.

(10) Patent No.: US 11,053,126 B2
(45) Date of Patent: Jul. 6, 2021

(54) PRODUCTION OF A POROUS PRODUCT INCLUDING POST ADAPTING A PORE STRUCTURE

(71) Applicant: Heraeus Quarzglas GmbH & Co. KG, Hanau (DE)

(72) Inventors: Sascha Pihan, Aschaffenburg (DE); Jörg Becker, Niddatal (DE); Christian Neumann, Hungen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 16/172,127

(22) Filed: Oct. 26, 2018

(65) Prior Publication Data

US 2019/0127228 A1 May 2, 2019

(30) Foreign Application Priority Data

Oct. 27, 2017 (EP) .................................... 17001780

(51) Int. Cl.
*C01B 32/342* (2017.01)
*C01B 33/18* (2006.01)
(Continued)

(52) U.S. Cl.
CPC ............. *C01B 32/342* (2017.08); *B01J 20/20* (2013.01); *B01J 20/3057* (2013.01);
(Continued)

(58) Field of Classification Search
CPC ....... C01B 32/342; C01B 33/18; C01B 32/05;
B32B 18/00; B01J 20/3057; B01J 20/20;
C03B 1/00; C04B 38/00; C04B 2235/483;
C04B 2235/422; C04B 2235/65; C04B
38/0029; C04B 35/52; C04B 35/16;
(Continued)

(56) References Cited

U.S. PATENT DOCUMENTS 3,532,473 A  10/1970 Biegler et al.
4,627,867 A  12/1986 Tanaka et al.
(Continued)

FOREIGN PATENT DOCUMENTS

DE  102011013075  9/2012
JP  H02-22120  1/1990
(Continued)

*Primary Examiner* — Daniel C. McCracken
(74) *Attorney, Agent, or Firm* — Dicke, Billig & Czaja, PLLC

(57) ABSTRACT

One aspect is a production process including feeding a feed material composition into a reaction zone at a feeding position, wherein the feed material composition is liquid or gaseous or both; reacting the feed material composition in the reaction zone into a first plurality of particles by a chemical reaction; depositing the first plurality of particles onto a substrate surface of a substrate, thereby obtaining a porous silicon dioxide material, having a pore structure, in the form of up to 20 layers superimposing the substrate surface; at least partially removing the porous silicon dioxide material from the substrate surface; and modifying the pore structure of the porous silicon dioxide material, thereby obtaining the porous silicon dioxide material having a further pore structure.

2 Claims, 11 Drawing Sheets

(51) Int. Cl.

| | | |
|---|---|---|
| *H01M 4/96* | (2006.01) | |
| *C04B 38/00* | (2006.01) | |
| *C01B 32/05* | (2017.01) | |
| *C04B 35/16* | (2006.01) | |
| *C03B 1/00* | (2006.01) | |
| *C04B 35/52* | (2006.01) | |
| *B01J 20/20* | (2006.01) | |
| *B01J 20/30* | (2006.01) | |
| *B32B 18/00* | (2006.01) | |
| *H01M 4/66* | (2006.01) | |
| *H01M 4/80* | (2006.01) | |
| *H01M 4/86* | (2006.01) | |
| *H01M 4/02* | (2006.01) | |

(52) U.S. Cl.
CPC .............. *B32B 18/00* (2013.01); *C01B 32/05* (2017.08); *C01B 33/18* (2013.01); *C03B 1/00* (2013.01); *C04B 35/16* (2013.01); *C04B 35/52* (2013.01); *C04B 38/00* (2013.01); *C04B 38/0029* (2013.01); *H01M 4/663* (2013.01); *H01M 4/80* (2013.01); *H01M 4/8626* (2013.01); *H01M 4/96* (2013.01); *C01P 2006/10* (2013.01); *C01P 2006/11* (2013.01); *C01P 2006/12* (2013.01); *C01P 2006/14* (2013.01); *C01P 2006/17* (2013.01); *C04B 2235/422* (2013.01); *C04B 2235/483* (2013.01); *C04B 2235/65* (2013.01); *H01M 2004/021* (2013.01)

(58) Field of Classification Search
CPC ...... H01M 4/8626; H01M 4/80; H01M 4/663; H01M 4/96; H01M 2004/021; H01M 4/587; C01P 2006/17; C01P 2006/14; C01P 2006/12; C01P 2006/11; C01P 2006/10
See application file for complete search history.

(56) References Cited

U.S. PATENT DOCUMENTS

| | | |
|---|---|---|
| 5,030,433 A | 7/1991 | Mehrotra |
| 5,676,725 A | 10/1997 | Ito et al. |
| 5,776,240 A | 7/1998 | Deller et al. |
| 6,047,564 A | 4/2000 | Schaper et al. |
| 6,306,500 B1 | 10/2001 | Kuwabara et al. |
| 6,360,563 B1 | 3/2002 | Gerhardt et al. |
| 6,380,110 B1 | 4/2002 | Werdecker et al. |
| 6,514,454 B1 | 2/2003 | Ganguli et al. |
| 7,655,209 B2 | 2/2010 | Rumpf et al. |
| 7,677,058 B2 | 3/2010 | Hawtof et al. |
| 8,137,469 B2 | 3/2012 | Hawtof et al. |
| 9,172,084 B2 | 10/2015 | Neumann et al. |
| 9,174,878 B2 | 11/2015 | Neumann |
| 9,520,594 B2 | 12/2016 | Neumann et al. |
| 9,718,690 B2 | 8/2017 | Neumann et al. |
| 2004/0007019 A1 | 1/2004 | Kohli |
| 2005/0005648 A1 | 1/2005 | Lee et al. |
| 2012/0178618 A1 | 7/2012 | Vinu et al. |
| 2012/0301387 A1 | 11/2012 | Neumann |
| 2013/0209891 A1 | 8/2013 | Neumann et al. |
| 2014/0232031 A1* | 8/2014 | Neumann ............. H01M 4/366 264/29.1 |
| 2017/0008769 A1 | 1/2017 | Otter et al. |

FOREIGN PATENT DOCUMENTS

| | | | |
|---|---|---|---|
| JP | H09286621 | 11/1997 | |
| JP | 2000319034 | 11/2000 | |
| JP | 2014511816 | 5/2014 | |
| JP | 2016531818 | 10/2016 | |
| WO | 02090276 | 11/2002 | |
| WO | WO 2012/119666 | * 9/2012 | ............. C04B 38/00 |

* cited by examiner

100

500

PRODUCTION OF A POROUS PRODUCT INCLUDING POST ADAPTING A PORE STRUCTURE

CROSS-REFERENCE TO RELATED APPLICATION

This Utility Patent Application claims priority to Application No. EP 17001780.0-1, filed on Oct. 27, 2017, which is incorporated herein by reference.

BACKGROUND

One aspect generally relates to a process for the production of a porous silicon dioxide material and to a porous silicon dioxide material; to a process for the production of a porous carbon product and to a porous carbon product; to a device comprising including a porous carbon product; to a use of a porous carbon product in an electrode; and to a use of a porous silicon dioxide material in a production of a porous carbon product.

Processes for producing a porous carbon material using a template acting as negative to shape the carbon are known in the prior art. Therein, the carbon material is characterized by a pore structure which is substantially predetermined by the structure of the template material. The template can for example be made from a silicon oxide. A process for producing a silicon oxide template known in the prior art is the so called sol-gel process. The sol-gel route to preparation of silicon oxide is well known to the skilled person. For example, producing a monolithic silica body via the sol gel process is described in U.S. Pat. No. 6,514,454 B1.

Additionally, a porous carbon material that is known in the prior art is carbon black. Carbon black is produced by incomplete combustion of heavy petroleum products such as FCC tar, coal tar, ethylene cracking tar, and a small amount from vegetable oil. Such a process for the production of carbon black is for example disclosed in U.S. Pat. No. 7,655,209 B2. The applications of porous carbon are generally based on the properties of the pore structure. Known applications are electrodes, such as in lithium ion cells in which simultaneous transport of ions and electrons through the electrode material is required; catalysts, in which a high active surface area and pore accessibility are required; and fuel cells, in which transport of fuel and electrical conductivity are required.

For these and other reasons, a need exists for the present embodiments.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 9b illustrates a diagram illustrating the pore structure of a porous material obtained from the removed porous silicon dioxide material of FIG. 9a.

DETAILED DESCRIPTION

Figure 1:
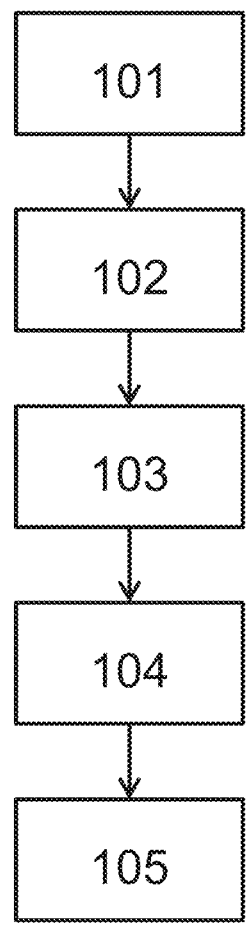
FIG. 1 illustrates a flow chart diagram of a process according to one embodiment for the production of a porous product.

In the following Detailed Description, reference is made to the accompanying drawings, which form a part hereof, and in which is illustrated by way of illustration specific embodiments in which one embodiments may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present embodiments. The following detailed description, therefore, is not to be taken in a limiting sense, and the scope of the present embodiments are defined by the appended claims.

It is to be understood that the features of the various exemplary embodiments described herein may be combined with each other, unless specifically noted otherwise.

Generally, it is an object of one embodiment to at least partly overcome a disadvantage arising from the prior art. It is an object of one embodiment to provide an improved porous carbon material. It is another object of one embodiment to provide a template material suitable for producing an improved carbon material. It is yet another object of one embodiment to provide a process for producing a porous carbon material, wherein the process has an increased number of degrees of freedom for predetermining a pore size distribution of the porous carbon material.

It is an object of one embodiment to provide a process for the preparation of a porous silicon dioxide product which is easier to perform.

It is an object of one embodiment to provide a process for the preparation of a porous silicon dioxide product with a higher energy efficiency.

It is an object of one embodiment to provide a process for the preparation of a porous carbon product which is easier to perform.

It is an object of one embodiment to provide a process for the preparation of a porous carbon product with a higher energy efficiency.

It is an object of one embodiment to provide a process for the preparation of a porous silicon dioxide product with increased homogeneity.

It is an object of one embodiment to provide a process for the preparation of a porous silicon dioxide product with a more homogeneous pore size distribution.

It is an object of one embodiment to provide a process for the preparation of a porous silicon dioxide product with a more highly controllable pore size distribution.

It is an object of one embodiment to provide a process for the preparation of a porous silicon dioxide product with a more homogeneous particle size distribution.

It is an object of one embodiment to provide a process for the preparation of a porous silicon dioxide product with a more highly controllable particle size distribution.

It is an object of one embodiment to provide a process for the preparation of a porous carbon product with increased homogeneity.

It is an object of one embodiment to provide a process for the preparation of a porous carbon product with a more homogeneous pore size distribution.

It is an object of one embodiment to provide a process for the preparation of a porous carbon product with a more highly controllable pore size distribution.

It is an object of one embodiment to provide a process for the preparation of a porous carbon product with a more homogeneous particle size distribution.

It is an object of one embodiment to provide a process for the preparation of a porous carbon product with a more highly controllable particle size distribution.

It is an object of one embodiment to provide an electrochemical cell, in one embodiment a Li-ion cell, having improved electrical properties.

It is an object of one embodiment to provide an electrochemical cell, in one embodiment a Li-ion cell, having more highly controllable electrical properties.

It is an object of one embodiment to provide an electrode having improved electrical properties.

It is an object of one embodiment to provide an electrode having more highly controllable electrical properties.

It is an object of one embodiment to provide a porous catalyst material having improved catalytic properties, for example, an improved access to active sites.

It is an object of one embodiment to provide a porous catalyst materials having more highly controllable catalytic properties, for example, more highly controllable catalytic selectivity.

A contribution to at least one of the above objects is made by the independent claims. The dependent claims provide additional embodiments that also serve to solve at least one of the above mentioned objects.

|1| A production process (100) comprising the process steps (101 to 105) of:
  a) Feeding a feed material composition into a reaction zone (305) at a feeding position, wherein the feed material composition is liquid or gaseous or both;
  b) Reacting the feed material composition in the reaction zone (305) into a first plurality of particles by a chemical reaction;
  c) Depositing the first plurality of particles onto a substrate surface (302) of a substrate (301), thereby obtaining a porous silicon dioxide material (309), having a pore structure, in the form of up to 20, in one embodiment up to 10, in one embodiment up to 5, in one embodiment up to 3, in one embodiment 1 to 2, in one embodiment 1, layers superimposing the substrate surface (302);
  d) At least partial removal of the porous silicon dioxide material (309) from the substrate surface (302), and
  e) Modification of the pore structure of the porous silicon dioxide material (309), thereby obtaining the porous silicon dioxide material having a further pore structure.

In one aspect, step d) precedes step e). In another aspect, step e) precedes step d).

|2| The process (100) according to embodiment |1|, wherein in process step c) one or both of the following is satisfied:
  a. the substrate (301) is rotating at a tangential velocity in the range from 0.1 to 10.0 m/min, in one embodiment in the range from 0.5 to 8.0 m/min, in one embodiment in the range from 1.0 to 6 m/min;
  b. the distance from the feeding position to the substrate surface (302) is in the range from 1 to 300 cm, in one embodiment in the range from 5 to 250 cm, in one embodiment in the range from 10 to 200 cm.

|3| The process (100) according to embodiment |1| or |2|, wherein process step e) includes a thermal treatment of the porous silicon dioxide material (309).

|4| The process (100) according to embodiment |3|, wherein the thermal treatment satisfies one or more of the following:
  a. The maximum temperature in the thermal treatment is higher than the maximum temperature of the substrate surface reached in steps a) to d), in one embodiment at least 10° C. higher, in one embodiment at least 20° C. higher, in one embodiment at least 30° C. higher;
  b. The thermal treatment includes the steps of:
    i) Increasing the temperature of the porous silicon dioxide material (309) to a temperature in the range from 1100 to 1400° C., or in the range from 1100 to 1150° C., or in the range from 1150 to 1200° C., or in the range from 1200 to 1250° C., or in the range from 1250 to 1300° C., or in the range from 1300 to 13500° C., or in the range from 1350 to 1400° C.; in one embodiment in the range from 1150 to 1250° C. or the range from 1150 to 1200° C., or in the range from 1200 to 1250° C.
    ii) Holding the temperature of the porous silicon dioxide material (309) at a temperature in the range from 1100 to 1400° C., or in the range from 1100 to 1150° C., or in the range from 1150 to 1200° C., or in the range from 1200 to 1250° C., or in the range from 1250 to 1300° C., or in the range from 1300 to 1350° C., or in the range from 1350 to 1400° C., for a duration in the range from 100 to 2000 min, or from 100 to 300 min, or from 300 to 500 min, or from 500 to 800 min, or from 800 to 1500 min, or from 1500 to 2000 min, and
    iii) Decreasing the temperature of the porous silicon dioxide material (309) below 1000° C., in one embodiment below 900° C., in one embodiment below 800° C.;
  c. The temperature of the removed porous silicon dioxide material is increased at a rate in the range from 2 to 10°

C./min in the thermal treatment, in one embodiment in the range from 3 to 8° C./min, in one embodiment in the range from 4 to 7° C./min.

In one aspect of this embodiment, step d) precedes step e). It is preferred in one embodiment in this aspect that step e) is carried out as a batch process.

In one aspect of this embodiment, the temperature range in b.i) is the same as the temperature range in b.ii).

In one aspects of this embodiment, the following combinations of temperature range and duration are employed in option b.: 1150 to 1200° C. for 300 to 500 min, or 1150 to 1200° C. for 500 to 800 min, or 1150 to 1200° C. for 800 to 1500 min, or 1200 to 1250° C. for 300 to 500 min, or 1200 to 1250° C. for 500 to 800 min, or 1200 to 1250° C. for 800 to 1500 min In one aspect of this embodiment, the cooling in step iii) is performed by passive cooling only, in one embodiment by standing at ambient temperature.

|5| The process (100) according to any of the preceding embodiments, wherein in process step e) the modification of the first pore structure includes one or more of the following:
  a. a reduction of the width of the pore size distribution of the porous silicon dioxide material (309),
  b. a reduction of the porosity of the porous silicon dioxide material (309)
  c. a reduction of the total pore volume of the porous silicon dioxide material (309),
  d. a reduction of the number of modes of a multi-modal pore size distribution of the porous silicon dioxide material (309) by at least one mode.

Each of the above criteria could be combined and form one aspect of this embodiment. The following combinations of criteria are preferred in one embodiment: a, b, c, d, ab, ac, ad, bc, bd, cd, abc, abd, acd, bcd and abcd; in one embodiment abc or abcd, in one embodiment abcd. In a further embodiment, the modification of pore structure in step e) includes modifying a peak in the pore size distribution either by making the peak narrower, or by changing the peak value, or both. In one aspect of this embodiment, a peak is simultaneously narrowed and its peak value moved.

|6| The process (100) according to any of the preceding embodiments, wherein subsequent to process step d) the porous silicon dioxide material (309) is broken up.

In one embodiment, the breaking up includes one or more selected from the group consisting of crushing, grinding, milling, air-blade cutting and electrodynamic fragmentation, in one embodiment crushing. The energy for breaking up the porous silicon dioxide material can be provided mechanically or otherwise, for example from an ultrasonic source.

In one aspect of this embodiment, the breaking up precedes the modification step e). In another aspect, the breaking up comes after the modification step e).

|7| The process (100) according to any of the preceding embodiments, wherein in process step c) the thickness of the up to 20 layers of the porous silicon dioxide material (309) is in the range from 10 to 500 µm.

In a further embodiment, one or more, in one embodiment all of the up to 20 layers each has/have a thickness in the range from 5 to 150 µm, in one embodiment in the range from 10 to 50 µm, in one embodiment in the range from 15 to 25 µm. In some cases, a layer may have a thickness of up to around 200 µm.

In one embodiment, one or more, in one embodiment all of the up to 20 layers each has/have a thickness in the range from 5 to 150 µm and the substrate surface moves with a tangential speed in the range from 0.6 m/min to 20 m/min In another embodiment, one or more, in one embodiment all of the up to 20 layers each has/have a thickness in the range from 13 to 24 µm and the substrate surface moves with a tangential speed in the range from 2.5 m/min to 5 m/min;

|8| The process (100) according to any of the preceding embodiments, wherein in process step b) the chemical reaction is a pyrolysis or a hydrolysis or both.

|9| A porous silicon dioxide material obtainable by a process according to one of the preceding embodiments.

In a further embodiment, the porous silicon dioxide material is obtained by a process according to one of the preceding embodiments.

|10| A porous silicon dioxide material satisfying one or more of the following criteria:
  a) a cumulative pore volume in the range from 0.3 to 5.9 $cm^3/g$, in one embodiment in the range from 0.6 to 5 $cm^3/g$, in one embodiment in the range from 0.8 to 3.0 $cm^3/g$ for pores having a diameter in the range from 10 to 10000 nm;
  b) a material density in the range from 2 to 2.3 $g/cm^3$, in one embodiment in the range from 2.05 to 2.25 $g/cm^3$, in one embodiment in the range from 2.1 to 2.2 $g/cm^3$;
  c) a bulk density in the range from 0.4 to 1.5 $g/cm^3$, in one embodiment in the range from 0.5 to 1.2 $g/cm^3$, in one embodiment in the range from 0.6 to 0.9 $g/cm^3$;
  d) a porosity in the range from 0.15 to 0.85, in one embodiment in the range from 0.3 to 0.8, in one embodiment in the range from 0.55 to 0.75;
  e) a total specific surface area according to BET-SSA in the range of from 5 to 140 $m^2/g$, in one embodiment in the range from 7 to 130 $m^2/g$, in one embodiment in the range from 10 to 110 $m^2/g$;
  f) a specific surface area of pores having a pore diameter of less than 2 nm in the range from 0 to 20 $m^2/g$, in one embodiment in the range from 0 to 10 $m^2/g$, in one embodiment in the range from 0.1 to 5 $m^2/g$;
  g) a pore size distribution determined in the range from 10 to 10000 nm being characterised by
    i) a $D_{10}$ in the range from 20 to 100 nm, in one embodiment in the range from 30 to 90 nm, in one embodiment in the range from 40 to 80 nm,
    ii) a $D_{50}$ in the range from 150 to 1000 nm, in one embodiment in the range from 200 to 900 nm, in one embodiment in the range from 300 to 800 nm, and
    iii) a $D_{90}$ in the range from 2000 to 5000 nm, in one embodiment in the range from 2300 to 4700 nm, in one embodiment in the range from 2600 to 4300 nm;
  h) a pore size distribution determined in the range from 10 to 10000 nm being characterised by a difference between $D_{90}$ and $D_{10}$ in the range from 1900 to 4980 nm, in one embodiment in the range from 2210 to 4670 nm, in one embodiment in the range from 2520 to 4260 nm;
  i) a pore size distribution determined in the range from 10 to 10000 nm being characterised by a ratio of $D_{10}:D_{90}$ in the range from 1:20 to 1:250, in one embodiment in the range from 1:26 to 1:157, in one embodiment in the range from 1:33 to 1:108;
  j) a cumulative pore volume in the range from 0.01 to 0.2 $cm^3/g$, in one embodiment in the range from 0.01 to 0.1 $cm^3/g$, in one embodiment in the range from 0.02 to 0.1 $cm^3/g$, for pores having a pore diameter in the range from 10 to 100 nm;
  k) a cumulative pore volume in the range from 0.1 to 2.0 $cm^3/g$, in one embodiment in the range from 0.5 to 1.5 $cm^3/g$, in one embodiment in the range from 0.5 to 1.3 cm$^3$/g for pores having a pore diameter of more than 100 nm and up to 1000 nm; and l) a cumulative pore volume in the range from 0.01 to 1.0 cm$^3$/g, in one embodiment in the range from 0.02 to 0.8 cm$^3$/g, in one embodiment in the range from 0.02 to 0.1 cm$^3$/g for pores having a pore diameter of more than 1000 nm and up to 10000 nm

|11| A process for the preparation of a porous carbon product comprising the steps of:
I. Providing a porous silicon dioxide material according either to embodiment |9| or to embodiment |10| or to both;
II. Contacting the porous silicon dioxide material with a carbon source (606);
III. At least partially carbonising the carbon source (606), thereby obtaining a precursor comprising the porous silicon dioxide material and carbon; and
IV. at least partially removing the porous silicon dioxide material from the precursor, thereby obtaining the porous carbon product.

A further process for the preparation of a porous carbon product includes the steps of:
I. Providing a porous silicon dioxide material by carrying out step a), b), c) & e) of embodiment |11|;
II. Contacting the porous silicon dioxide material with a carbon source (606);
III. At least partially carbonising the carbon source (606), thereby obtaining a precursor comprising the porous silicon dioxide material and carbon; and
IV. at least partially removing the porous silicon dioxide material from the precursor, thereby obtaining the porous carbon product.

In one aspect of this embodiment, the silicon dioxide material which has been contacted with the carbon source is at least partially removed from the substrate surface between steps II and III.

In one aspect of this embodiment, the precursor is at least partially removed from the substrate surface between steps III and IV. This aspect is preferred in one embodiment where the carbon source is coal tar pitch.

A further aspect of this embodiment includes a breaking up of one or more selected from the group consisting of: the silicon dioxide material which has been contacted with the carbon source, the precursor, the carbon product.

The features introduced in connection with the process of embodiments |2| to |8| can also be employed in this embodiment

|12| A porous carbon product obtainable by the process (100) according to embodiment |11|. In one embodiment, the porous carbon product satisfies one or more of the features introduced in the embodiment |13| to |22|.

|13| A porous carbon product satisfying one or more of the following criteria:
A) a material density in the range from 1.5 to 2.3 g/cm$^3$, in one embodiment in the range from 1.6 to 2.2 g/cm$^3$, in one embodiment in the range from 1.7 to 2.1 g/cm$^3$;
B) a bulk density in the range from 0.2 to 1.2 g/cm$^3$, in one embodiment in the range from 0.3 to 1.1 g/cm$^3$, in one embodiment in the range from 0.4 to 1.0 g/cm$^3$;
C) a porosity in the range from 0.4 to 0.9, in one embodiment in the range from 0.45 to 0.85, in one embodiment in the range from 0.5 to 0.8;
D) a total specific surface area according to BET-SSA in the range of from 20 to 800 m$^2$/g), in one embodiment in the range from 30 to 750 m$^2$/g, in one embodiment in the range from 40 to 700 m$^2$/g;
E) a specific surface area of pores having a pore diameter of less than 2 nm in the range from 0 to 400 m$^2$/g, in one embodiment in the range from 0 to 300 m$^2$/g, in one embodiment in the range from 1 to 250 m$^2$/g;
F) a pore size distribution determined between 10 and 10000 nm being characterised by
a. a $D_{10}$ in the range from 20 to 100 nm, in one embodiment in the range from 30 to 90 nm, in one embodiment in the range from 40 to 80 nm,
b. a $D_{50}$ in the range from 50 to 1000 nm, in one embodiment in the range from 60 to 900 nm, in one embodiment in the range from 70 to 800 nm, and
c. a $D_{90}$ in the range from 2000 to 9000 nm, in one embodiment in the range from 2500 to 8500 nm, in one embodiment in the range from 3000 to 8000 nm;
G) a pore size distribution determined in the range from 10 to 10000 nm being characterised by a difference between $D_{90}$ and $D_{10}$ in the range from 1900 to 8980 nm, in one embodiment in the range from 2410 to 8470 nm, in one embodiment in the range from 2920 to 7960 nm;
H) a pore size distribution determined in the range from 10 to 10000 nm being characterised by a ratio of $D_{10}:D_{90}$ in the range from 1:20 to 1:450, in one embodiment in the range from 1:28 to 1:283, in one embodiment in the range from 1:38 to 1:200;
I) a cumulative pore volume in the range from 0.20 to 2.50 cm$^3$/g, in one embodiment in the range from 0.3 to 2.4 cm$^3$/g, in one embodiment in the range from 0.4 to 2.3 cm$^3$/g for pores having a pore diameter in the range from 10 to 100 nm;
J) a cumulative pore volume in the range from 0.20 to 2.50 cm$^3$/g, in one embodiment in the range from 0.3 to 2.4 cm$^3$/g, in one embodiment in the range from 0.4 to 2.3 cm$^3$/g for pores having a pore diameter of more than 100 nm and up to 1000 nm; and
K) a cumulative pore volume in the range from 0.01 to 1.00 cm$^3$/g, in one embodiment in the range from 0.05 to 0.9 cm$^3$/g, in one embodiment in the range from 0.1 to 0.8 cm$^3$/g for pores having a pore diameter of more than 1000 nm and up to 10000 nm.

|14| A porous carbon product satisfying one or more of the following criteria:
A) a material density in the range from 1.6 to 2.1 g/cm$^3$ in one embodiment in the range from 1.7 to 2.05 g/cm$^3$, in one embodiment in the range from 1.8 to 2.0 g/cm$^3$;
B) a bulk density in the range from 0.05 to 0.7 g/cm$^3$, in one embodiment in the range from 0.08 to 0.6 g/cm$^3$, in one embodiment in the range from 0.1 to 0.5 g/cm$^3$;
C) a porosity in the range from 0.5 to 0.9, in one embodiment in the range from 0.6 to 0.9, in one embodiment in the range from 0.7 to 0.9;
D) a total specific surface area according to BET-SSA in the range of from 20 to 80 m$^2$/g, in one embodiment in the range from 30 to 60 m$^2$/g, in one embodiment in the range from 40 to 55 m$^2$/g;
E) a specific surface area of pores having a pore diameter of less than 2 nm in the range from 5 to 25 m$^2$/g, in one embodiment in the range from 7 to 18 m$^2$/g, in one embodiment in the range from 8 to 12 m$^2$/g;
F) a pore size distribution determined between 10 and 10000 nm being characterised by
a. a $D_{10}$ in the range from 20 to 150 nm, in one embodiment in the range from 40 to 100 nm, in one embodiment in the range from 50 to 65 nm, b. a $D_{50}$ in the range from 300 to 800 nm, in one embodiment in the range from 400 to 750 nm, in one embodiment in the range from 450 to 700 nm, and
c. a $D_{90}$ in the range from 500 to 7000 nm, in one embodiment in the range from 700 to 6500 nm, in one embodiment in the range from 800 to 6000 nm;
G) a pore size distribution determined in the range from 10 to 10000 nm being characterised by a difference between $D_{90}$ and $D_{10}$ in the range from 350 to 6980 nm, in one embodiment in the range from 600 to 6460 nm, in one embodiment in the range from 735 to 5950 nm nm;
H) a pore size distribution determined in the range from 10 to 10000 nm being characterised by a ratio of $D_{10}$:$D_{90}$ in the range from 1:3 to 1:350, in one embodiment in the range from 1:7 to 1:163, in one embodiment in the range from 1:12 to 1:120;
I) a cumulative pore volume in the range from 0.05 to 0.45 cm$^3$/g, in one embodiment in the range from 0.10 to 0.35 cm$^3$/g, in one embodiment in the range from 0.15 to 0.25 cm$^3$/g, for pores having a pore diameter in the range from 10 to 100 nm;
J) a cumulative pore volume in the range from 0.70 to 1.60 cm$^3$/g, in one embodiment in the range from 0.80 to 1.40 cm$^3$/g, in one embodiment in the range from 0.95 to 1.25 cm$^3$/g, for pores having a pore diameter of more than 100 nm and up to 1000 nm; and
K) a cumulative pore volume in the range from 0.05 to 1.5 cm$^3$/g, in one embodiment in the range from 0.1 to 1.2 cm$^3$/g, in one embodiment in the range from 0.15 to 1.05 cm$^3$/g, for pores having a pore diameter of more than 1000 nm and up to 10000 nm.—

|15| A porous carbon product satisfying one or more of the following criteria:
A) a material density in the range from 1.5 to 2.3 g/cm$^3$ in one embodiment in the range from 1.6 to 2.27 g/cm$^3$, in one embodiment in the range from 2.1 to 2.25 g/cm$^3$;
B) a bulk density in the range from 0.15 to 0.8 g/cm$^3$, in one embodiment in the range from 0.17 to 0.7 g/cm$^3$, in one embodiment in the range from 0.2 to 0.6 g/cm$^3$;
C) a porosity in the range from 0.5 to 0.95, in one embodiment in the range from 0.6 to 0.8, in one embodiment in the range from 0.7 to 0.9;
D) a total specific surface area according to BET-SSA in the range of from 10 to 50 m$^2$/g, in one embodiment in the range from 12 to 40 m$^2$/g, in one embodiment in the range from 15 to 30 m$^2$/g;
E) a specific surface area of pores having a pore diameter of less than 2 nm in the range from 0 to 3 m$^2$/g, in one embodiment in the range from 0 to 2 m$^2$/g, in one embodiment in the range from 0 to 1 m$^2$/g;
F) a pore size distribution determined between 10 and 10000 nm being characterised by
d. a $D_{10}$ in the range from 20 to 200 nm, in one embodiment in the range from 30 to 150 nm, in one embodiment in the range from 40 to 100 nm,
e. a $D_{50}$ in the range from 300 to 550 nm, in one embodiment in the range from 350 to 500 nm, in one embodiment in the range from 400 to 450 nm, and
f. a $D_{90}$ in the range from 1000 to 8000 nm, in one embodiment in the range from 3000 to 7000 nm, in one embodiment in the range from 5000 to 6000 nm;
G) a pore size distribution determined in the range from 10 to 10000 nm being characterised by a difference between $D_{90}$ and $D_{10}$ in the range from 800 to 7980 nm, in one embodiment in the range from 2850 to 6970 nm, in one embodiment in the range from 4900 to 5960 nm;
H) a pore size distribution determined in the range from 10 to 10000 nm being characterised by a ratio of $D_{10}$:$D_{90}$ in the range from 1:5 to 1:400, in one embodiment in the range from 1:20 to 1:233, in one embodiment in the range from 1:50 to 1:150;
I) a cumulative pore volume in the range from 0.05 to 0.15 cm$^3$/g, in one embodiment in the range from 0.06 to 0.12 cm$^3$/g, in one embodiment in the range from 0.08 to 0.10 cm$^3$/g, for pores having a pore diameter in the range from 10 to 100 nm;
J) a cumulative pore volume in the range from 0.6 to 1.4 cm$^3$/g, in one embodiment in the range from 0.7 to 1.3 cm$^3$/g, in one embodiment in the range from 0.8 to 1.2 cm$^3$/g, for pores having a pore diameter of more than 100 nm and up to 1000 nm; and
a cumulative pore volume in the range from 0.02 to 0.5 cm$^3$/g, in one embodiment in the range from 0.03 to 0.45 cm$^3$/g, in one embodiment in the range from 0.05 to 0.40 cm$^3$/g, for pores having a pore diameter of more than 1000 nm and up to 10000 nm.—

|16| A porous carbon product satisfying one or more of the following criteria:
A) a material density in the range from 1.35 to 2.0 g/cm$^3$, in one embodiment in the range from 1.40 to 1.90 g/cm$^3$, in one embodiment in the range from 1.45 to 1.85 g/cm$^3$;
B) a bulk density in the range from 0.08 to 0.5 g/cm$^3$, in one embodiment in the range from 0.09 to 0.4 g/cm$^3$, in one embodiment in the range from 0.1 to 0.3 g/cm$^3$;
C) a porosity in the range from 0.6 to 0.95, in one embodiment in the range from 0.7 to 0.90, in one embodiment in the range from 0.70 to 0.85;
D) a total specific surface area according to BET-SSA in the range of from 300 to 600 m$^2$/g, in one embodiment in the range from 350 to 580 m$^2$/g, in one embodiment in the range from 400 to 530 m$^2$/g;
E) a specific surface area of pores having a pore diameter of less than 2 nm in the range from 200 to 400 m$^2$/g, in one embodiment in the range from 225 to 375 m$^2$/g, in one embodiment in the range from 250 to 350 m$^2$/g;
F) a pore size distribution determined between 10 and 10000 nm being characterised by
g. a $D_{10}$ in the range from 20 to 100 nm, in one embodiment in the range from 25 to 80 nm, in one embodiment in the range from 30 to 65 nm,
h. a $D_{50}$ in the range from 100 to 450 nm, in one embodiment in the range from 150 to 400 nm, in one embodiment in the range from 200 to 385 nm, and
i. a $D_{90}$ in the range from 450 to 7000 nm, in one embodiment in the range from 600 to 6500 nm, in one embodiment in the range from 1000 to 6000 nm;
G) a pore size distribution determined in the range from 10 to 10000 nm being characterised by a difference between $D_{90}$ and $D_{10}$ in the range from 350 to 6980 nm, in one embodiment in the range from 520 to 6475 nm, in one embodiment in the range from 935 to 5970 nm
H) a pore size distribution determined in the range from 10 to 10000 nm being characterised by a ratio of $D_{10}$:$D_{90}$ in the range from 1:5 to 1:350, in one embodiment in the range from 1:8 to 1:260, in one embodiment in the range from 1:15 to 1:200
I) a cumulative pore volume in the range from 0.2 to 0.8 cm$^3$/g, in one embodiment in the range from 0.3 to 0.7 cm$^3$/g, in one embodiment in the range from 0.4 to 0.6 cm$^3$/g, for pores having a pore diameter in the range from 10 to 100 nm;

J) a cumulative pore volume in the range from 1.4 to 2.1 cm$^3$/g, in one embodiment in the range from 1.6 to 2.0 cm$^3$/g, in one embodiment in the range from 1.8 to 1.9 cm$^3$/g, for pores having a pore diameter of more than 100 nm and up to 1000 nm; and K) a cumulative pore volume in the range from 0.1 to 0.5 cm$^3$/g, in one embodiment in the range from 0.12 to 0.35 cm$^3$/g, in one embodiment in the range from 0.15 to 0.25 cm$^3$/g, for pores having a pore diameter of more than 1000 nm and up to 10000 nm.—

[17] A porous carbon product satisfying one or more of the following criteria:

A) a material density in the range from 1.6 to 2.05 g/cm$^3$, in one embodiment in the range from 1.65 to 2.00 g/cm$^3$, in one embodiment in the range from 1.7 to 1.95 g/cm$^3$;

B) a bulk density in the range from 0.08 to 0.5 g/cm$^3$, in one embodiment in the range from 0.09 to 0.4 g/cm$^3$, in one embodiment in the range from 0.1 to 0.3 g/cm$^3$;

C) a porosity in the range from 0.6 to 0.95 in one embodiment in the range from 0.65 to 0.92 in one embodiment in the range from 0.7 to 0.9;

D) a total specific surface area according to BET-SSA in the range of from 30 to 90 m$^2$/g, in one embodiment in the range from 40 to 80 m$^2$/g, in one embodiment in the range from 50 to 70 m$^2$/g;

E) a specific surface area of pores having a pore diameter of less than 2 nm in the range from 0 to 10 m$^2$/g, in one embodiment in the range from 0 to 7 m$^2$/g, in one embodiment in the range from 0 to 5 m$^2$/g;

F) a pore size distribution determined between 10 and 10000 nm being characterised by
  j. a $D_{10}$ in the range from 15 to 100 nm, in one embodiment in the range from 20 to 80 nm, in one embodiment in the range from 25 to 65 nm,
  k. a $D_{50}$ in the range from 100 to 450 nm, in one embodiment in the range from 150 to 410 nm, in one embodiment in the range from 200 to 380 nm, and
  l. a $D_{90}$ in the range from 400 to 6000 nm, in one embodiment in the range from 450 to 5000 nm, in one embodiment in the range from 500 to 4000 nm;

G) a pore size distribution determined in the range from 10 to 10000 nm being characterised by a difference between $D_{90}$ and $D_{10}$ in the range from 300 to 5985 nm, in one embodiment in the range from 370 to 4980 nm, in one embodiment in the range from 435 to 3975 nm H) a pore size distribution determined in the range from 10 to 10000 nm being characterised by a ratio of $D_{10}:D_{90}$ in the range from 1:4 to 1:400, in one embodiment in the range from 1:6 to 1:250, in one embodiment in the range from 1:8 to 1:160

I) a cumulative pore volume in the range from 0.2 to 0.6 cm$^3$/g, in one embodiment in the range from 0.25 to 0.5 cm$^3$/g, in one embodiment in the range from 0.3 to 0.4 cm$^3$/g, for pores having a pore diameter in the range from 10 to 100 nm;

J) a cumulative pore volume in the range from 1.2 to 2.3 cm$^3$/g, in one embodiment in the range from 1.3 to 2.2 cm$^3$/g, in one embodiment in the range from 1.5 to 2.0 cm$^3$/g, for pores having a pore diameter of more than 100 nm and up to 1000 nm; and K) a cumulative pore volume in the range from 0.05 to 1.5 cm$^3$/g, in one embodiment in the range from 0.07 to 1.3 cm$^3$/g, in one embodiment in the range from 0.1 to 1.1 cm$^3$/g, for pores having a pore diameter of more than 1000 nm and up to 10000 nm.—

[18] A porous carbon product satisfying one or more of the following criteria:

A) a material density in the range from 1.4 to 1.8 g/cm$^3$ in one embodiment in the range from 1.45 to 1.7 g/cm$^3$, in one embodiment in the range from 1.50 to 1.65 g/cm$^3$;

B) a bulk density in the range from 0.05 to 0.6 g/cm$^3$, in one embodiment in the range from 0.07 to 0.55 g/cm$^3$, in one embodiment in the range from 0.1 to 0.5 g/cm$^3$;

C) a porosity in the range from 0.5 to 0.9 in one embodiment in the range from 0.6 to 0.8 in one embodiment in the range from 0.6 to 0.7;

D) a total specific surface area according to BET-SSA in the range of from 15 to 65 m$^2$/g, in one embodiment in the range from 20 to 55 m$^2$/g, in one embodiment in the range from 25 to 45 m$^2$/g;

E) a specific surface area of pores having a pore diameter of less than 2 nm in the range from 0 to 30 m$^2$/g, in one embodiment in the range from 2 to 20 m$^2$/g, in one embodiment in the range from 5 to 15 m$^2$/g;

F) a pore size distribution determined between 10 and 10000 nm being characterised by
  m. a $D_{10}$ in the range from 20 to 60 nm, in one embodiment in the range from 25 to 50 nm, in one embodiment in the range from 30 to 40 nm,
  n. a $D_{50}$ in the range from 250 to 400 nm, in one embodiment in the range from 275 to 360 nm, in one embodiment in the range from 295 to 335 nm, and
  o. a $D_{90}$ in the range from 500 to 700 nm, in one embodiment in the range from 550 to 650 nm, in one embodiment in the range from 580 to 620 nm;

G) a pore size distribution determined in the range from 10 to 10000 nm being characterised by a difference between $D_{90}$ and $D_{10}$ in the range from 440 to 680 nm, in one embodiment in the range from 500 to 625 nm, in one embodiment in the range from 540 to 590 nm;

H) a pore size distribution determined in the range from 10 to 10000 nm being characterised by a ratio of $D_{10}:D_{90}$ in the range from 1:8 to 1:35, in one embodiment in the range from 1:11 to 1:26, in one embodiment in the range from 1:15 to 1:21;

I) a cumulative pore volume in the range from 0.20 to 0.60 cm$^3$/g, in one embodiment in the range from 0.25 to 0.50 cm$^3$/g, in one embodiment in the range from 0.30 to 0.40 cm$^3$/g, for pores having a pore diameter in the range from 10 to 100 nm;

J) a cumulative pore volume in the range from 0.20 to 0.70 cm$^3$/g, in one embodiment in the range from 0.25 to 0.60 cm$^3$/g, in one embodiment in the range from 0.30 to 0.50 cm$^3$/g, for pores having a pore diameter of more than 100 nm and up to 1000 nm; and K) a cumulative pore volume in the range from 0.10 to 0.50 cm$^3$/g, in one embodiment in the range from 0.15 to 0.40 cm$^3$/g, in one embodiment in the range from 0.20 to 0.30 cm$^3$/g, for pores having a pore diameter of more than 1000 nm and up to 10000 nm.—

[19] A porous carbon product satisfying one or more of the following criteria:

A) a material density in the range from 1.40 to 1.80 g/cm$^3$, in one embodiment in the range from 1.45 to 1.75 g/cm$^3$, in one embodiment in the range from 1.50 to 1.70 g/cm$^3$;

B) a bulk density in the range from 0.05 to 0.6 g/cm$^3$, in one embodiment in the range from 0.07 to 0.55 g/cm$^3$, in one embodiment in the range from 0.1 to 0.5 g/cm$^3$;

C) a porosity in the range from 0.6 to 0.9 in one embodiment in the range from 0.65 to 0.85 in one embodiment in the range from 0.7 to 0.8;

D) a total specific surface area according to BET-SSA in the range of from 350 to 550 m$^2$/g, in one embodiment in the range from 370 to 500 m$^2$/g, in one embodiment in the range from 400 to 440 m$^2$/g;

E) a specific surface area of pores having a pore diameter of less than 2 nm in the range from 180 to 350 m$^2$/g, in one embodiment in the range from 210 to 320 m$^2$/g, in one embodiment in the range from 230 to 290 m$^2$/g;

F) a pore size distribution determined between 10 and 10000 nm being characterised by
  p. a $D_{10}$ in the range from 15 to 50 nm, in one embodiment in the range from 17 to 42 nm, in one embodiment in the range from 20 to 35 nm,
  q. a $D_{50}$ in the range from 150 to 300 nm, in one embodiment in the range from 180 to 250 nm, in one embodiment in the range from 200 to 225 nm, and
  r. a $D_{90}$ in the range from 330 to 470 nm, in one embodiment in the range from 350 to 450 nm, in one embodiment in the range from 380 to 420 nm;

G) a pore size distribution determined in the range from 10 to 10000 nm being characterised by a difference between $D_{90}$ and $D_{10}$ in the range from 280 to 455 nm, in one embodiment in the range from 308 to 433 nm, in one embodiment in the range from 345 to 400 nm H) a pore size distribution determined in the range from 10 to 10000 nm being characterised by a ratio of $D_{10}:D_{90}$ in the range from 1:7 to 1:31, in one embodiment in the range from 1:8 to 1:26, in one embodiment in the range from 1:11 to 1:21

I) a cumulative pore volume in the range from 0.8 to 1.6 cm$^3$/g, in one embodiment in the range from 0.9 to 1.5 cm$^3$/g, in one embodiment in the range from 1.0 to 1.4 cm$^3$/g, for pores having a pore diameter in the range from 10 to 100 nm;

J) a cumulative pore volume in the range from 0.4 to 1.0 cm$^3$/g, in one embodiment in the range from 0.5 to 0.9 cm$^3$/g, in one embodiment in the range from 0.6 to 0.8 cm$^3$/g, for pores having a pore diameter of more than 100 nm and up to 1000 nm; and K) a cumulative pore volume in the range from 0.05 to 0.5 cm$^3$/g, in one embodiment in the range from 0.08 to 0.35 cm$^3$/g, in one embodiment in the range from 0.10 to 0.25 cm$^3$/g, for pores having a pore diameter of more than 1000 nm and up to 10000 nm.—

|20| A porous carbon product according to any of the embodiments |12| to |19|, wherein the porous carbon product comprises a plurality of pores having:
  a. a volume $P_1$ of pores having a pore size in the range from more than 50 up to 1000 nm, as measured by mercury porosimetry;
  b. a volume $P_2$ of pores having a pore size in the range from 10 to 50 nm, as measured by mercury porosimetry;
  c. a volume $P_3$ of pores having a pore size in the range from more than 0 up to 6 nm, as measured by BJH-BET;
  d. a volume $P_4$ of pores having a pore size of 2 nm or less as measured by BJH-BET;
  e. a volume $P_5$ of pores having a pore size in the range from 0 up to less than 10 nm, as measured by BJH-BET;
  f. a total volume $P_S = P_1 + P_2 + P_5$;

wherein one or more of the following criteria are satisfied:
  i. $P_1$ is in the range from 0.1 to 2.5 cm$^3$/g, in one embodiment in the range from 0.2 to 2.4 cm$^3$/g, in one embodiment in the range from 0.3 to 2.3 cm$^3$/g;
  ii. $P_1/P_S$ is at least 0.1, in one embodiment at least 0.15, in one embodiment at least 0.2,
  iii. $P_2$ is in the range from 0.01 to 1 cm$^3$/g, in one embodiment 0.05 to 0.9 cm$^3$/g, in one embodiment 0.1 to 0.8 cm$^3$/g;
  iv. $P_4$ is less than 0.1 cm$^3$/g, in one embodiment less than 0.08 cm$^3$/g, in one embodiment less than 0.6 cm$^3$/g;
  v. $P_3$ is in the range from 0 up to 0.5 cm$^3$/g, in one embodiment from 0 to 0.45 cm$^3$/g, in one embodiment 0.01 to 0.4 cm$^3$/g;
  vi. $P_2/P_S$ is in the range from 0.01 to 0.5, in one embodiment from 0.02 to 0.45, in one embodiment from 0.05 to 0.4,
  vii. $P_1/P_S$ is at least 0.65, in one embodiment at least 0.67, in one embodiment at least 0.7, $P_2/P_S$ is in the range from 0.02 to 0.25, in one embodiment from 0.04 to 0.22, in one embodiment from 0.1 to 0.2, and $P_3/P_S$ is less than 0.10, in one embodiment less than 0.8, in one embodiment less than 0.7
  viii. $P_3/P_2$ is in the range from 0 to 0.2, in one embodiment from 0 to 0.15, in one embodiment from 0.01 to 0.12;
  ix. $P_3/P_2$ is in the range from 0.3 to 0.7, in one embodiment from 0.33 to 0.67, in one embodiment from 0.35 to 0.65.

|21| A porous carbon product according to any of the embodiments |12| to |19|, wherein the porous carbon product is a monolithic carbon body comprising a plurality of pores having:
  a. a volume $P_1$ of pores having a pore size in the range from more than 50 up to 1000 nm, as measured by mercury porosimetry;
  b. a volume $P_2$ of pores having a pore size in the range from 10 to 50 nm, as measured by mercury porosimetry;
  c. a volume $P_3$ of pores having a pore size in the range from more than 0 up to 6 nm, as measured by BJH-BET;
  d. a volume $P_4$ of pores having a pore size of 2 nm or less as measured by BJH-BET;
  e. a volume $P_5$ of pores having a pore size in the range from 0 up to less than 10 nm, as measured by BJH-BET;
  f. a total volume $P_S = P_1 + P_2 + P_5$;

wherein one or more of the following criteria are satisfied:
  i. $P_1$ is in the range from 0.1 to 10 cm$^3$/g, in one embodiment from 0.15 to 8 cm$^3$/g, in one embodiment from 0.2 to 7 cm$^3$/g;
  ii. $P_1/P_S$ is at least 0.1, in one embodiment at least 0.15, in one embodiment at least 0.2,
  iii. $P_2$ is in the range from 0.01 to 1 cm$^3$/g, in one embodiment from 0.05 to 0.9 cm$^3$/g, in one embodiment from 0.1 to 0.8 cm$^3$/g;
  iv. $P_4$ is less than 0.1 cm$^3$/g, in one embodiment less than 0.9 cm$^3$/g, in one embodiment less than 0.8 cm$^3$/g;
  v. $P_3$ is in the range from 0 up to 0.5 cm$^3$/g, in one embodiment from 0 to 0.45 cm$^3$/g, in one embodiment from 0.01 to 0.4 cm$^3$/g;
  vi. $P_2/P_S$ is in the range from 0.01 to 0.5, in one embodiment from 0.05 to 0.45, in one embodiment from 0.1 to 0.4,
  vii. $P_1/P_S$ is at least 0.65, in one embodiment at least 0.67, in one embodiment at least 0.7, $P_2/P_S$ is in the range from 0.02 to 0.25, in one embodiment from 0.04 to 0.22, in one embodiment from 0.05 to 0.20, and $P_3/P_S$ is less than 0.10, in one embodiment less than 0.09, in one embodiment less than 0.08;

viii. $P_3/P_2$ is in the range from 0 to 0.2, in one embodiment from 0 to 0.19, in one embodiment from 0.01 to 0.18;

ix. $P_3/P_2$ is in the range from 0.3 to 0.7, in one embodiment from 0.33 to 0.67, in one embodiment from 0.35 to 0.65.

|22| A porous carbon product according to any of the embodiments |12| to |19|, wherein the porous carbon product is a monolithic carbon body comprising a plurality of pores having:

a. a volume $P_1$ of pores having a pore size in the range from more than 50 up to 1000 nm, as measured by mercury porosimetry;

b. a volume $P_2$ of pores having a pore size in the range from 10 to 50 nm, as measured by mercury porosimetry;

c. a volume $P_3$ of pores having a pore size in the range from more than 0 up to 6 nm, as measured by BJH-BET;

d. a volume $P_4$ of pores having a pore size of 2 nm or less as measured by BJH-BET;

e. a volume $P_5$ of pores having a pore size in the range from 0 up to less than 10 nm, as measured by BJH-BET;

f. a total volume $P_S=P_1+P_2+P_5$;

wherein one or more of the following criteria are satisfied:

i. $P_1$ is in the range from 0.1 to 10 cm$^3$/g, in one embodiment from 0.15 to 8 cm$^3$/g, in one embodiment from 0.2 to 7 cm$^3$/g;

ii. $P_1/P_S$ is at least 0.1, in one embodiment at least 0.15, in one embodiment at least 0.2, iii. $P_2$ is in the range from 0.01 to 1 cm$^3$/g, in one embodiment from 0.05 to 0.9 cm$^3$/g, in one embodiment from 0.1 to 0.8 cm$^3$/g;

iv. $P_4$ is less than 0.1 cm$^3$/g, in one embodiment less than 0.9 cm$^3$/g, in one embodiment less than 0.8 cm$^3$/g;

v. $P_3$ is in the range from 0 up to 0.5 cm$^3$/g, in one embodiment from 0 to 0.45 cm$^3$/g, in one embodiment from 0.01 to 0.4 cm$^3$/g;

vi. $P_2/P_S$ is in the range from 0.01 to 0.5, in one embodiment from 0.05 to 0.45, in one embodiment from 0.1 to 0.4, vii. $P_1/P_S$ is at least 0.65, in one embodiment at least 0.67, in one embodiment at least 0.7, $P_2/P_S$ is in the range from 0.02 to 0.25, in one embodiment from 0.04 to 0.22, in one embodiment from 0.05 to 0.20, and $P_3/P_S$ is less than 0.10, in one embodiment less than 0.09, in one embodiment less than 0.08;

viii. $P_3/P_2$ is in the range from 0 to 0.2, in one embodiment from 0 to 0.19, in one embodiment from 0.01 to 0.18;

ix. $P_3/P_2$ is in the range from 0.3 to 0.7, in one embodiment from 0.33 to 0.67, in one embodiment from 0.35 to 0.65.

|23| A device comprising the porous carbon product according to one of the embodiments |12| to |22|.

|24| The device according to embodiment |23|, comprising an electrode which comprises the porous carbon product in a range from 0.1 to 10 wt. %, in one embodiment in the range from 0.3 to 8 wt. %, in one embodiment in the range from 0.5 to 6 wt. %, based on the total weight of the electrode.

|25| The device according to embodiment |23| or |24|, wherein the device is an electrochemical device.

|26| A use of the porous carbon product according to one of the embodiments |12| to |22| in an electrode.

|27| The use according to embodiment |26|, wherein the porous carbon product is present in the electrode in the range from 0.1 to 10 wt. %, in one embodiment in the range from 0.3 to 8 wt. %, in one embodiment in the range from 0.5 to 6 wt. %, based on the total weight of the electrode.

|28| A use of the porous silicon dioxide material according either to embodiment |9| or to embodiment |10| or to both in the production of a porous carbon material (800).

In one embodiment, in process step a) the feed material composition is fed into the reaction zone at a feeding rate in kg/min. The feeding rate is in one embodiment selected by the skilled person in line with the dimensions of the instrumental setup. Further in one embodiment, in process step c) a fraction of 0.5 to 0.95, in one embodiment 0.6 to 0.9, in one embodiment 0.7 to 0.85, of the first plurality of particles is deposited onto the substrate surface, thereby obtaining the porous silicon dioxide material. Further in one embodiment, in process step c) the porous silicon dioxide material is obtained at a deposition rate in kg/min, wherein the ratio of deposition rate and feeding rate is in the range from 0.02 to 0.2, in one embodiment from 0.1 to 0.2, in one embodiment from 0.17 to 0.19.

In the following, the term "template" is used to refer to a porous silicon dioxide material and therefore disclosures relating to the template can apply to the porous silicon dioxide material before or after the removal step d), before or after any process for reducing the size of the porous silicon dioxide material and before or after the modification step e). In one embodiment, the term "template" refers to a porous silicon dioxide material which has already been modified in a modification step e).

Chemical Reaction of the Feed Material Composition/Starting Materials

The reaction zone is in one embodiment formed from a flame or flames of at least one reaction burner, in one embodiment at least 2 reaction burners, in one embodiment at least 3 reaction burners, in one embodiment at least 5 reactions burners, in one embodiment at least 10 reaction burners which are in one embodiment pointed towards the substrate surface. In one embodiment, the reaction zone is formed from multiple reaction burners which are arranged in at least one row, in one embodiment at least 2 rows, in one embodiment at least 3 rows. Therein, the reaction burners of different rows are in one embodiment arranged offset to each other. In one embodiment the reaction zone is formed from at least one linear burner, in one embodiment from at least 2 linear burners, in one embodiment from at least 3 linear burners. Therein, each linear burner provides multiple flames in a row. In one embodiment reaction burner moves back and forth, in one embodiment keeping a constant distance to the substrate surface. In one embodiment, multiple reaction burners are arranged on a single burner feed, wherein the burner feed moves forth and back.

In one embodiment in which more than one layer of silicon dioxide is deposited on the substrate surface, silicon dioxide is deposited on the substrate surface at more than one position, in one embodiment by two or more rows of burners. In an aspect of this embodiment, silicon dioxide is deposited at two or more locations, wherein a single layer is deposited at each location.

The process for preparation of the template in one embodiment includes one or more pyrolysis and/or hydrolysis steps in order to obtain intermediate particles or so called primary particles. These primary particles, or so called secondary particles formed by agglomeration thereof should be suited to deposition on the substrate surface. The first plurality of particles can be the primary particles or the secondary particles or a mixture of both.

It is preferred in one embodiment for pyrolysis and/or hydrolysis to be carried out at increased temperature, in one embodiment at a temperature adapted to break chemical bonds in the starting materials. In one embodiment, pyrolysis and/or hydrolysis is carried out at a temperature greater than about 250° C., in one embodiment greater than about 300° C., in one embodiment greater than about 400° C., further in one embodiment greater than about 600° C., in one embodiment greater than about 700° C. Usually the pyrolysis and/or hydrolysis is carried out up to the adiabatic flame temperature. This temperature depends on the feed material composition and is usually less 3100° C.

The starting materials, synonymously referred to as the feed material composition, are in one embodiment in a liquid phase or in a gas phase or both. It is preferred in one embodiment for the feed material composition to include one or more silicon sources, which in one embodiment is/are suitable for providing a silicon including primary particles. In one embodiment silicon including primary particles are one or more selected from the group consisting of: neutral primary particles or charged primary particles, in one embodiment neutral primary particles. In one embodiment neutral primary particles in this context are one or more selected from the group consisting of: a silicon atom and a silicon oxide, in one embodiment a silicon oxide, in one embodiment $SiO_2$. In one embodiment silicon sources are organic or inorganic. In one embodiment inorganic silicon sources are one or more selected from the group consisting of: a siloxane, a silicon halide, a silane and silicic acid. In one embodiment organic silicon sources are one or more selected from the group consisting of: an organic silane, in one embodiment an alkyl silane; a silanol; a siloxide; a siloxane; a silyl ether; a silanylidene; a silene and a silole; in one embodiment selected from the group consisting of: an alkyl silane, a silyl ether and a silyl ester; in one embodiment an alkyl silane.

In one embodiment siloxanes in this context are one or more selected from the group consisting of: a linear siloxane and a cyclic siloxane. In one embodiment linear siloxanes in this context are one or more selected from the group consisting of silicone or a derivative thereof, disiloxane, hexamethyldisiloxane, polydimethylsiloxane, polymethylhydrosiloxane, and polysilicone-15. In one embodiment cyclic siloxanes in this context are one or more selected from the group consisting of: octamethylcyclotetrasiloxane, decamethylcyclopentasiloxane, and dodecamethylcyclohexasiloxane, in one embodiment octamethylcyclotetrasiloxane.

In one embodiment silicon halides in this context are one or more selected from the group consisting of: $SiF_4$, $SiCl_4$, and $SiBr_4$; in one embodiment one or more selected from the group consisting of: $SiCl_4$ and $SiBr_4$; in one embodiment $SiCl_4$. In one embodiment the feed material includes a higher order silicon halide, in one embodiment of the general form $Si_nX_{2n+2}$, wherein n is an integer greater than 1, in one embodiment in the range from 2 to 20, in one embodiment in the range from 3 to 15, in one embodiment in the range from 4 to 10, and wherein X is a halide, in one embodiment one or more selected from F, Cl and Br, in one embodiment one or more selected from Cl and Br; in one embodiment Cl. In one embodiment higher order silicon halides in this context are one or more selected from the group consisting of: $Si_2Cl_6$, $Si_3Cl_8$, $Si_4Cl_{10}$, $Si_5Cl_{12}$, $Si_6Cl_{14}$, $Si_7Cl_{16}$ and $Si_8Cl_{18}$, in one embodiment $Si_2Cl_6$. In one embodiment alkyl silicon halides have one or more halogen atoms replaced with an alkyl group, in one embodiment selected from the group consisting of: methyl, ethyl, propyl, butyl and pentyl, in one embodiment one or more selected form the group consisting of: methyl and ethyl, in one embodiment methyl.

In one embodiment alkyl silanes in this context are one or more compounds with the general formula $SiH_xR_{4-x}$, wherein x is a number in the range from 0 to 3; and R is an alkyl group and the R in the molecule may be the same as or different to each other. In one embodiment alkyl groups R in this context are one or more selected from the group consisting of: methyl, ethyl, propyl, butyl and pentyl; in one embodiment one or more selected from the group consisting of: methyl and ethyl; in one embodiment methyl. In one embodiment alkyl silanes in this context are one or more selected from the group consisting of: $Si(CH_3)_4$, $SiH(CH_3)_3$, $SiH_2(CH_3)_2$, $SiH_3(CH_3)$, $Si(C_2H_5)_4$, $SiH(C_2H_5)_3$, $SiH_2(C_2H_5)_2$, $SiH_3(C_2H_5)$, $Si(C_3H_7)_4$, $SiH(C_3H_7)_3$, $SiH_2(C_3H_7)_2$, $SiH_3(C_3H_7)$, $Si(C_4H_9)_4$, $SiH(C_4H_9)_3$, $SiH_2(C_4H_9)_2$, $SiH_3(C_4H_9)$; in one embodiment selected from the group consisting of: $Si(CH_3)_4$, $Si(C_2H_5)_4$, $Si(C_3H_7)_4$ and $Si(C_4H_9)_4$. In one embodiment, the feed material includes a higher order alkyl silane, in one embodiment with the formula $Si_nH_yR_z$, wherein n is a an integer greater than 1, in one embodiment in the range from 2 to 20, in one embodiment in the range from 3 to 15, in one embodiment in the range from 4 to 10, wherein y and z sum to 2*n+2 and wherein z is one or more.

In one embodiment silyl ethers are one or more compounds with the general formula $SiH_xR_y(OR)_z$, wherein x and y are numbers in the range from 0 to 3; z is a number in the range from 1 to 4; x, y and z sum to 4; and R is an alkyl group, wherein the R in the molecule may be the same as or different to each other. In one embodiment alkyl groups R in this context are one or more selected from the group consisting of: methyl, ethyl, propyl, butyl and pentyl; in one embodiment one or more selected from the group consisting of: methyl and ethyl; in one embodiment methyl. In one embodiment silyl ethers in this context are one or more selected from the group consisting of: $Si(OCH_3)_4$, $SiH(OCH_3)_3$, $SiH_2(OCH_3)_2$, $SiH_3(OCH_3)$, $Si(OC_2H_5)_4$, $SiH(OC_2H_5)_3$, $SiH_2(OC_2H_5)_2$, $SiH_3(OC_2H_5)$, $Si(OC_3H_7)_4$, $SiH(OC_3H_7)_3$, $SiH_2(OC_3H_7)_2$, $SiH_3(OC_3H_7)$, $Si(OC_4H_9)_4$, $SiH(OC_4H_9)_3$, $SiH_2(OC_4H_9)_2$, $SiH_3(OC_4H_9)$, $Si(OCH_3)_4$, $Si(CH_3)(OCH_3)_3$, $Si(CH_3)_2(OCH_3)_2$, $Si(CH_3)_3(OCH_3)$, $Si(OC_2H_5)_4$, $Si(CH_3)(OC_2H_5)_3$, $Si(CH_3)_2(OC_2H_5)_2$, $Si(CH_3)_3(OC_2H_5)$, $Si(OC_3H_7)_4$, $Si(CH_3)(OC_3H_7)_3$, $Si(CH_3)_2(OC_3H_7)_2$, $Si(CH_3)_3(OC_3H_7)$, $Si(OC_4H_9)_4$, $Si(CH_3)(OC_4H_9)_3$, $Si(CH_3)_2(OC_4H_9)_2$, $Si(CH_3)_3(OC_4H_9)$; in one embodiment selected from the group consisting of $SiH_3(OCH_3)_3$, $SiH_2(OCH_3)_2$, $SiH(OCH_3)_3$, $Si(OCH_3)_4$, $Si(CH_3)_3(OCH_3)_3$, $Si(CH_3)_2(OCH_3)_2$, $Si(CH_3)(OCH_3)_3$; in one embodiment $Si(CH_3)_2(OCH_3)_2$ or $SiH_2(OCH_3)_2$. In one embodiment, the feed material includes a higher order silyl ether, in one embodiment with the formula $Si_nH_xR_y(OR)_z$, wherein n is a an integer greater than 1, in one embodiment in the range from 2 to 20, in one embodiment in the range from 3 to 15, in one embodiment in the range from 4 to 10, z is one or more, and wherein x, y and z sum to 2*n+2.

In one embodiment, the starting materials include a silicon source with the general chemical formula:

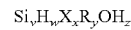

$$Si_vH_wX_xR_yOH_z$$

Wherein v, w, x, y and z are positive integers;

v is a positive integer, in one embodiment in the range from 1 to 20, in one embodiment in the range from 1 to 15, further in one embodiment in the range from 1 to 10, in one embodiment 1;

w, x, y & z sum to 2*x+2;

R is an organic moiety, in one embodiment selected from the group consisting of: alkyl, alkenyl, ester and alkoxy; in one embodiment alkyl or alkoxy; wherein the R in the molecule can be the same as or different to each other;

X is a halogen; in one embodiment F, Cl, Br or I; in one embodiment Cl, Br or I; in one embodiment Cl; wherein the X in the molecule can be the same as or different to each other.

In one embodiment, the starting materials include a fuel for providing energy for pyrolysis and/or hydrolysis. In one embodiment fuels are one or more selected from the group consisting of: hydrogen and an organic compound; in one embodiment hydrogen. In one embodiment organic compounds in this context are one or more selected from the group consisting of: an alkane, an alkene, an alkyne, a ketone, an aldehyde and an ester; in one embodiment an alkane or an alkene; in one embodiment an alkane. In one embodiment alkanes in this context are one or more selected from the group consisting of: methane, ethane, propane, butane and pentane; in one embodiment methane. In one embodiment alkenes in this context are one or more selected from the group consisting of: ethene, propene, butene and pentene. In one embodiment alkyne is ethyne, also referred to as acetylene.

It is in one embodiment for the starting materials to include oxygen, both in order to liberate energy from the fuel and to allow formation of $SiO_2$ species. The relative amounts of the starting materials, the pressure of the starting materials and the temperature of the pyrolysis and/or hydrolysis can be selected by the skilled person in order to facilitate the advantageous properties of the embodiment.

Deposition Process

In process step c) of the process according to one embodiment the particles of the first plurality of particles are deposited onto the substrate surface of the substrate. The particles of the first plurality of particles are obtained from the above described chemical reaction in the reaction zone. In one embodiment, the first plurality of particles is a plurality of inorganic particles. In one embodiment inorganic particles are silicon oxide particles. In one embodiment silicon oxide is $SiO_2$. Throughout this document, the first plurality of particles is also referred to as soot or soot particles. Therein, the term soot relates to fine particles which are obtained from hydrolysis or pyrolysis or both. However, the term soot does not necessarily refer to carbon particles. Instead, in one embodiment soot particles are silicon oxide particles.

In one embodiment, the primary particles are obtained via a nucleation and subsequent growth process from a gaseous phase in the reaction zone. In one embodiment, the primary particles are characterised by an average particle size in the range from 5 to 500 nm, in one embodiment from 20 to 400 nm, in one embodiment from 50 to 250 nm.

In order to be deposited on the substrate surface, the primary particles have to cover a distance across the reaction zone from the position at which the primary particles are produced to the substrate surface. On their way to the substrate surface the primary particles interact with the reaction zone. Due to this and depending on the degree of interaction, the primary particles in one embodiment agglomerate to form secondary particles. Therein, the secondary particles as agglomerates of the primary particles include different numbers of primary particles. Hence, the secondary particles are characterised by a rather broad particle size distribution including particle sizes in a range from about 5 to about 5000 nm. The secondary particles are porous. Therein, the secondary particles include meso-pores between the agglomerated primary particles. The meso-pores are characterised by an average pore size in the range from 2 to 100 nm, in one embodiment from 10 to 80 nm, in one embodiment from 30 to 70 nm.

In one embodiment secondary particles are characterised by a specific surface area according to BET-SSA in the range from 5 to 140 $m^2/g$, in one embodiment from 6 to 30 $m^2/g$, in one embodiment from 7 to 15 $m^2/g$.

The secondary particles are deposited on the substrate surface. Therein, the substrate surface is in one embodiment one selected from the group consisting of a surface of a container, a surface of a dome, a lateral surface of a geometric body, a surface of a plate and a surface of a filter, or a combination of at least two thereof. In one embodiment surface of a container is an interior surface or an exterior surface or both of the container. In one embodiment geometric body is a prism. In one embodiment prism is a cylinder.

In one embodiment, the porous silicon dioxide material is formed on the substrate surface to a total thickness of the porous silicon dioxide material in the range from 10 to 500 µm, in one embodiment from 20 to 100 µm, in one embodiment from 20 to 50 µm.

A temperature of the substrate surface is in one embodiment controlled. Controlling the temperature of the substrate surface includes one selected from the group consisting of measuring the temperature of the substrate surface, heating the substrate surface, and cooling the substrate surface, or a combination of at least two thereof. In one embodiment, controlling the temperature of the substrate surface prevents the porous silicon dioxide material from being sintered throughout its total volume. In order to partially sinter the first plurality of particles on the substrate surface the first plurality of particles is in one embodiment heated by the reaction burners. However, in one embodiment the first plurality of particles on the substrate surface is heated by an additional heating. In one embodiment additional heating includes at least one further burner. In one embodiment additional heating is arranged on a backside of the substrate surface. In one embodiment, the substrate is a hollow body, in one embodiment a hollow cylinder, which includes the additional heating. In one embodiment additional heating is an infrared emitter. In one embodiment, the substrate has a temperature in the range from 500 to 1200° C., in one embodiment from 500 to 750° C., in one embodiment from 550 to 650° C. The technical features provided in the above paragraph are preferred in one embodiment in the context of an embodiment according to which the particles of the first plurality of particles form exactly 1 layer of the porous silicon dioxide material on the substrate surface.

In one embodiment, a surface of the porous silicon dioxide material on the substrate surface has a temperature in the range from 800 to 1500° C., in one embodiment from 900 to 1400° C., in one embodiment from 1000 to 1300° C., wherein the surface of the porous silicon dioxide material faces the reaction zone.

The porous silicon dioxide material which is formed on the substrate surface includes the particles of the first plurality of particles in form of agglomerates. Therein, the agglomerates include the above described meso-pores. Between the agglomerates the porous silicon dioxide material includes macro-pores. The macro-pores are in one embodiment characterised by an average pore size in the range from 0.1 to 1.0 µm, in one embodiment from 0.2 to 0.9 µm, in one embodiment from 0.4 to 0.6 µm.

In one embodiment, the porous silicon dioxide material has a relative density in the range from 10 to 40%, in one embodiment from 20 to 35% and in one embodiment from 22 to 30%, of the material density of the porous silicon dioxide material. The porous silicon dioxide material having the aforementioned relative density is in one embodiment in the context of an embodiment according to which the particles of the first plurality of particles form exactly 1 layer of the porous silicon dioxide material on the substrate surface.

Therein, the material density is the density of the porous silicon dioxide material excluding the pores. The relative density of the porous silicon dioxide material is in one embodiment adjusted by means of one selected from the group consisting of the temperature of the substrate surface, a temperature of the porous silicon dioxide material during an additional heat treatment on the substrate surface, and a mechanical pressure which acts on the porous silicon dioxide material on the substrate surface, or by a combination of at least two thereof. The porous silicon dioxide material including meso-pores and different levels of macro-pores is also referred to as having a hierarchic porosity or a hierarchic pore size distribution or both. Therein, the macro-pores in one embodiment provide an open porosity to the porous silicon dioxide material. Hence, the macro-pores in one embodiment provide a system of interconnected channels throughout the porous silicon dioxide material. In one embodiment porous silicon dioxide material obtained in process step c) according to one embodiment is characterised by a multimodal pore size distribution. In one embodiment multimodal pore size distribution includes 2 to 10 modes, in one embodiment 2 to 8 modes, in one embodiment 2 to 6 modes, in one embodiment 2 to 4 modes.

In one embodiment the porous silicon dioxide material is obtained on the substrate surface in form of exactly one layer superimposing the substrate surface. A layer of the porous silicon dioxide material, in one embodiment each layer of the porous silicon dioxide material, is in one embodiment characterised by a layer thickness in the range from 10 to 500 μm, in one embodiment from 20 to 100 μm, in one embodiment from 20 to 50 μm. In one embodiment layer of the porous silicon dioxide material has a bulk density in the range from 0.3 to 1.25 g/cm$^3$, in one embodiment from 0.4 to 1.2 g/cm$^3$, in one embodiment from 0.5 to 1.1 g/cm$^3$, and in one embodiment from 0.5 to 0.7 g/cm$^3$. Therein, the bulk density is the density of the porous silicon dioxide material including the material of the porous silicon dioxide material and the pores. In one embodiment a layer of the porous silicon dioxide material, in one embodiment each layer of the porous silicon dioxide material, is characterised by a layer thickness in the range from 1 to 10 μm, in one embodiment from 3 to 5 μm.

In the process step d) of the process according to one embodiment the porous silicon dioxide material is at least partially removed from the substrate surface. In one embodiment, the porous silicon dioxide material is removed from substrate surface by means of a gas stream. Therein, the gas stream is in one embodiment directed onto a backside of the porous silicon dioxide material, wherein the backside faces the substrate surface. In one embodiment gas stream is an air stream. Such an air stream is also known as air knife or air blade. According to another embodiment the porous silicon dioxide material is removed from substrate surface by means of a solid blade or a solid edge. In one embodiment solid blade/edge is made from a metal or from a ceramic or from both. Therein, in one embodiment metal is stainless steel.

In certain embodiments, it is preferred in one embodiment for a porous material to be reduced in size. The porous material for reduction in size can be one or more selected from the group consisting of: the silicon dioxide material, the porous silicon dioxide material, the precursor, or the porous carbon product. A reduction provides a second plurality of particles. In one embodiment, the porous material is reduced in size in a size reduction zone, wherein the size reduction zone is at least partially spatially separated from the substrate surface. In one embodiment, the size reduction zone is at least partially separated from the substrate surface by a shielding between the size reduction zone and the substrate surface. In one embodiment, spatially separating the size reduction zone from the substrate surface mitigates contamination of the reaction zone with dust from the size reduction zone. In one embodiment, the porous material is reduced in size by one selected from the group consisting of cutting, breaking and crushing or a combination of at least two thereof. In one embodiment, the porous material is reduced in size in a size reduction device, wherein the size reduction device in one embodiment includes at least two rotating rollers between which the porous material is fed. In one embodiment, the rollers include profiled surfaces. In one embodiment, the size reduction device is designed such that the second plurality of particles obtained by reducing the size of the porous silicon dioxide material in the size reduction device is characterised by an as narrow as possible particle size distribution.

In one embodiment, in the case of a porous silicon dioxide material or porous silicon dioxide material, the particles of the second plurality of particles are characterised by a particle size which is larger than the particle size of the particles of the first plurality of particles, in one embodiment than the particle size of the secondary particles. In one embodiment, the particles of the second plurality of particles are non-spherical. In one embodiment non-spherical particles are rods or flakes or both. In one embodiment, a thickness of the particles of the second plurality of particles is equal or less than a thickness of the porous silicon dioxide material on the substrate surface. In one embodiment particles of the second plurality of particles are characterised by a dimension ratio of at least 5, in one embodiment of at least 10.

In one embodiment particles of the second plurality of particles are characterised by a thickness in the range from 10 to 500 μm, in one embodiment from 20 to 100 μm, in one embodiment from 20 to 50 μm.

In one embodiment, the particles of the second plurality of particles are characterised by an as high as possible surface to volume ratio. In one embodiment, the particles of the second plurality of particles include cut surfaces or fracture surfaces or both which illustrates open pores.

In one embodiment at least the process steps a) to d) of the process according to one embodiment are performed continuously. Therein, in one embodiment substrate surface is revolving. In one embodiment revolving substrate surface is a surface of a rotating body or a surface of a conveyor belt or both. In one embodiment rotating body is a right circular cylinder. In one embodiment, the substrate rotates about its longitudinal axis. Therein, the substrate surface is in one embodiment a lateral surface of the cylinder shaped substrate. The substrate surface is in one embodiment made from a material which allows easy removal of the porous silicon dioxide material from the substrate surface. In one embodiment, the material of the substrate surface does not join the porous silicon dioxide material at a temperature which the porous silicon dioxide material experiences on the substrate surface. In one embodiment substrate includes an inner part which is made of an inner material and an outer part which is made of an outer material. Therein, the substrate surface is a surface of the outer part. In one embodiment inner material is a metal. In one embodiment metal is steel. In one embodiment steel is a stainless steel. In one embodiment outer material is a ceramic. In one embodiment ceramic outer material is silicon carbide. In one embodiment the substrate is a rotating cylinder. The cylinder rotates about its longitudinal axis. Therein, the substrate surface is a lateral surface of the rotating cylinder. In one embodiment rotating cylinder is a hollow cylinder.

In one embodiment, the breaking up step yields non-spherical particles. In one aspect of this embodiment, the non-spherical particles are flakes or rods or both. In one embodiment non-spherical particles are characterised by a dimension ratio of at least 5, in one embodiment of at least 10. In one embodiment non-spherical particles are characterised by a thickness in the range from 10 to 500 µm, in one embodiment from 20 to 100 µm, in one embodiment from 20 to 50 µm.

In one embodiment 10 of the process 1 the process is designed according to any of its preceding embodiments, wherein process step e) includes thermally treating the removed porous silicon dioxide material. In one embodiment thermally treating is a sintering.

In one embodiment, in process step c) the substrate is rotating at a tangential velocity in the range from 0.1 to 10.0 m/min, in one embodiment from 0.5 to 9.5 m/min, in one embodiment from 1.0 to 8.5 m/min, in one embodiment from 2.0 to 7.0 m/min. In one embodiment substrate surface is a lateral surface of a cylinder. Therefore, in one embodiment substrate is cylindrical. In another embodiment in process step c) the tangential velocity of the substrate is adjusted in order to obtain the porous silicon dioxide material in the form of more than one layer on the substrate surface, wherein the layers are characterised by a constant thickness. Therefore in one embodiment, the tangential velocity of the substrate is decreased, in one embodiment within the range from 0.1 to 10.0 m/min, in one embodiment from 0.5 to 9.5 m/min, in one embodiment from 1.0 to 8.5 m/min, in one embodiment from 2.0 to 7.0 m/min, in process step c).

In one embodiment, the distance from the feeding position to the substrate surface is in the range from 1 to 300 cm, in one embodiment from 5 to 250 cm, in one embodiment from 10 to 200 cm, in one embodiment from 10 to 150, in one embodiment from 30 to 100 cm.

In one embodiment, the substrate is a hollow body enclosing an inner volume.

In one embodiment, in process step c), the temperature of the substrate is controlled from within the inner volume. In one embodiment controlling of the temperature of the substrate is a heating or a cooling or both. In one embodiment the substrate is cooled in order to facilitate the removal in process step d). In one embodiment cooling of the substrate is a cooling by an air stream.

In one embodiment, the substrate is characterised by a first coefficient of linear thermal expansion, wherein the porous silicon dioxide material is characterised by a further coefficient of linear thermal expansion, wherein an absolute value of a difference of the first coefficient of linear thermal expansion and the further coefficient of linear thermal expansion is in the range from $1.90 \cdot 10^{-5}$ to $2.00 \cdot 10^{-5}$ 1/K, in one embodiment from $1.93 \cdot 10^{-5}$ to $1.97 \cdot 10^{-5}$ 1/K, in one embodiment from $1.94 \cdot 10^{-5}$ to $1.96 \cdot 10^{-5}$ 1/K. In one embodiment, the first coefficient of linear thermal expansion is more than the further coefficient of linear thermal expansion.

In one embodiment, in process step d), the at least partial removal of the porous silicon dioxide material includes contacting the porous silicon dioxide material with a gas stream or an edge or both. In one embodiment, the porous silicon dioxide material is removed from the substrate surface using an air knife or an air blade or both. In one embodiment edge is one selected from the group consisting of an edge of a knife, a blade, and a scraper, or a combination of at least two thereof, which are in one embodiment made of a metal or a ceramic or both. In one embodiment metal is stainless steel.

Activation of Template

Optionally, the template may be treated, for example, prior to impregnation with the carbon source, in order to introduce chemical functionality onto the surface of the template. In one embodiment, the adapted porous silicon dioxide material is treated in such a manner.

In one embodiment, the template is treated with a silane in order the increase the hydrophobic nature of its surface. In one embodiment silanes in this context are compounds with the general formula $SiH_xR_{4-x}$, wherein x is an integer in the range from 0 to 4; and R is an alkyl group and the R in the molecule may be the same as or different to each other. In one embodiment alkyl groups R in this context are one or more selected from the group consisting of: methyl, ethyl, propyl, butyl and pentyl; in one embodiment one or more selected from the group consisting of: methyl and ethyl; in one embodiment methyl.

In another embodiment, the template is treated with one or more selected from the group consisting of: a siloxane, a silazane, and any other organic material.

Carbon Source

The carbon source is suitable for contacting, in one embodiment impregnating, the template and forming a carbon body on carbonisation. In one embodiment carbon sources include carbon, further elements which are at least partially removed on carbonisation and optionally further elements which at least partially remain in the carbon body on carbonisation as hetero-centres.

In one embodiment the carbon source includes one or more aromatic systems including carbon sources. In one embodiment aromatic systems contribute to the formation of carbon sheets in the porous carbon product obtained in process step h). In one embodiment aromatic systems include one or more aromatic rings and/or one or more double aromatic rings and/or one or more triple aromatic rings and/or one or more structural units formed of four or more aromatic rings. In one embodiment aromatic systems are selected from the group consisting of a pitch, and naphthol, or a combination of at least two thereof. In one embodiment pitch is petroleum pitch or a mesophase pitch or both. In one aspect of this embodiment, the aromatic system is a liquid, a solid or present in solution. In one embodiment solvents in this context are chloroform and/or THF.

In one embodiment the carbon source includes one or more non-aromatic carbon sources. In one embodiment non-aromatic carbon sources are sugars, in one embodiment one or more selected from the group consisting of: saccharose, glucose and fructose. In one aspect of this embodiment, the non-aromatic carbon source is a liquid, a solid or present in solution. In one embodiment solvent in this context is water.

In one embodiment, the carbon source includes one or more aromatic systems and one or more non-aromatic carbon sources.

In one embodiment, the carbon source is a plurality of carbon source particles. In one embodiment plurality of carbon source particles is characterised by a particle size distribution having one selected from the group consisting of a $D_5$ in the range from 0.5 to 12, in one embodiment from 1 to 12 µm, in one embodiment from 2 to 9 µm, in one embodiment from 2.5 to 5 µm; a $D_{50}$ in the range from 2 to 30 µm, in one embodiment from 11 to 25 µm, in one embodiment from 12 to 20 µm, in one embodiment from 12 to 17 µm; and a $D_{95}$ in the range from 5 to 80 µm, in one embodiment from 50 to 80 µm, in one embodiment from 55 to 75 µm, in one embodiment from 57 to 70 µm; or a combination of at least two thereof. In one embodiment plurality of carbon source particles is characterised by a particle size distribution having one selected from the group consisting of a $D_5$ in the range from 0.5 to 12, in one embodiment from 0.5 to 10 µm, in one embodiment from 0.5 to 6 µm, in one embodiment from 1 to 4 µm; a $D_{50}$ in the range from 2 to 30 µm, in one embodiment from 2 to 20 µm, in one embodiment from 2 to 12 µm, in one embodiment from 3 to 8 µm; and a $D_{95}$ in the range from 5 to 80 µm, in one embodiment from 5 to 25 µm, in one embodiment from 5 to 20 µm, in one embodiment from 8 to 15 µm; or a combination of at least two thereof.

In one embodiment, the porous silicon dioxide material is contacted with a molten carbon source, namely a carbon source which is solid at ambient temperature and pressure, but which is molten at the contacting temperature. A molten material in this context is in one embodiment a softened solid or a viscous liquid or a liquid. In one aspect of this embodiment, the molten carbon source is coal tar pitch. In one aspect of this embodiment, the molten carbon source is solid at a temperature of 20° C. and a pressure of 1 bar. In one aspect of this embodiment, a molten carbon source is one which is a highly viscous fluid at ambient temperature. The carbon sources of this embodiment cannot be introduced into a porous material at ambient temperature or at least cannot be easily and effectively introduced into a porous material at ambient temperature. Upon heating, the carbon source can be introduced into a porous material due to softening and/or melting. In one aspect of this embodiment, the heat for melting the carbon source is provided as residual heat in the template. This residual heat may be derived from the silicon dioxide deposition step or a step of heating the porous silicon dioxide material or both. In one aspect of this embodiment, the carbon source is molten at a temperature in the range from 280° C. to 420° C., in one embodiment in the range from 300° C. to 400° C., in one embodiment in the range from 320° C. to 380° C.

In one embodiment, the silicon dioxide material is contacted with a carbon source dissolved in a solvent. Some solvents of mention in this context are water and organic solvents. In one aspect of this embodiment, the carbon source is a sugar dissolved in water. In another aspect of this embodiment, the carbon source is dissolved in an organic solvent. In one aspect of this embodiment, the solvent is volatile and has an evaporation temperature below the temperature employed in the carbonisation step.

Embodiments in which the carbon source is not dissolved in a solvent are in one embodiment over those embodiments in which the carbon source is dissolved in a solvent. For example, embodiments in which a carbon source is dissolved in an organic solvent are less favoured.

Contacting/Impregnation

The carbon source is contacted with the template, in one embodiment the porous silicon dioxide material, in order to at least partially occupy the pores of the template, in one embodiment by means of fluid flow. This step is also referred to as impregnation.

It is preferred in some embodiments for the carbon source to be introduced into at least part of the unoccupied volume of the template by fluid flow of a carbon source, in one embodiment in the form of a liquid, a solution or a melt.

In one embodiment, the carbon source is introduced into the template as a melt. The carbon source is in one embodiment mixed with the template in the form of particles and heated to melt the carbon source. The temperature of heating should be determined by the melting point of the carbon source.

The impregnation in one embodiment includes one or more steps selected form the group consisting of: dipping, spinning and pumping.

In one embodiment, two or more, in one embodiment three or more, in one embodiment four or more impregnations steps are carried out, in one embodiment interspersed by one or more carbonisation steps.

Carbonisation

The carbon source is at least partially carbonised. By carbonising the carbon source one selected from the group consisting of graphitic carbon, graphite-like carbon and non-graphitic carbon, or a combination of at least two thereof is obtained. Therein, in one embodiment non-graphitic carbon is turbostratic carbon. Non-graphitic carbon is a modification of carbon which is different from graphite.

In one embodiment of the process the carbonising includes obtaining a non-graphitic carbon from the carbon source, wherein in a subsequent process step graphite is obtained from the non-graphitic carbon by graphitisation.

During contacting the template with the carbon source, the carbon source in one embodiment has a temperature $T_a$. In one embodiment, $T_a$ is in the range from 10 to 500° C., in one embodiment from 15 to 400° C., in one embodiment from 100 to 370° C.

The carbonising in one embodiment includes heating the carbon source to a temperature $T_c$, wherein $T_c > T_a$. In one embodiment, $T_c$ is higher than 400° C., in one embodiment higher than 450° C., in one embodiment higher than 500° C.

The above given temperatures $T_a$ and $T_c$ can be fixed temperature values or suitable temperature ranges. For example, $T_c$ can be a fixed temperature which is in one embodiment higher than 300° C. However, $T_c$ can also be a temperature range, wherein the temperatures of the temperature range are in one embodiment each higher than 300° C. Therein, the temperatures of the temperatures range $T_c$ have to be suitable for carbonising the carbon source. Holding the temperatures of the carbon source and/or the carbon obtained from the carbon source at $T_c$ can mean keeping the temperature constant at a specific value $T_c$ or holding the temperature in a temperature range $T_c$. This applies analogously to $T_a$. Therein, $T_a$ is a specific temperature or a temperature range which is suitable for contacting the carbon source with the template.

Removing the Adapted Template/Etching

In process step h) the template is at least partially, in one embodiment substantially, removed, in one embodiment by etching, from a solid body (precursor) including both the template and the carbon, obtained from carbonisation, to obtain the porous carbon product.

In one embodiment at least about 50 wt.-%, in one embodiment at least about 80 wt.-%, in one embodiment at least about 95-wt.-%, in one embodiment at least about 99 wt.-% of the template material, based on the total weight of template material in the solid body including template and carbon, is removed in the etching step.

Etching in one embodiment includes a step of chemical dissolution in one embodiment with an acid or a base. In one embodiment acid is a Brønsted acid, in one embodiment an inorganic Brønsted acid. In one embodiment base is a Brønsted base, in one embodiment an inorganic Brønsted base. In one embodiment inorganic Brønsted acid is HF. In one embodiment inorganic Brønsted base is NaOH.

Following etching, the porous carbon product obtained is in one embodiment rinsed and in one embodiment dried. Rinsing is in one embodiment with water.

Graphitisation

The process of one embodiment optionally includes one or more graphitisation steps which in one embodiment causes structural changes to the porous carbon product, in one embodiment in the surface of the porous carbon body. Graphitisation is in one embodiment performed after removal of the template.

In one embodiment temperatures for the graphitisation step are in the range from about 500 to about 3000° C., in one embodiment in the range from about 1000 to about 2500° C., in one embodiment in the range from about 1300 to about 2300° C. Where a graphitisable carbon source is present, graphitisation in one embodiment increases the content of graphite like 2D sheets in the porous carbon body. Where a non-graphitisable carbon source is present, graphitisation in one embodiment converts some micropores on the surface of the porous carbon product to turbostratic carbon.

Activation of the Porous Carbon Product

In one embodiment, the porous carbon product is chemically activated. In one embodiment, the porous carbon product is heated in the presence of oxygen, in one embodiment at a temperature in the range from about 200 to about 700° C., in one embodiment in the range from about 300 to about 600° C., in one embodiment in the range from about 400 to about 500° C., in order to bring about oxidisation of the carbon surface, in one embodiment selective oxidisation of non-graphitic carbon sites.

Sizing

For the use throughout this document sizing means any means of determining a size of a precursor or product. The size can be determined by reducing in size or by classifying or both. An example for reducing in size is milling. An example for classifying is sieving. The process according to one embodiment can include several sizing steps.

In one embodiment of the process the porous silicon dioxide material, also referred to as template, is reduced in size. In one embodiment, the template is reduced in size in a first reducing in size step and subsequently in a second reducing in size step. The first reducing in size step can be performed prior to or after the template has been removed from the substrate. In one embodiment, the first reducing in size step is performed after the template has been removed from the substrate. In one embodiment first reducing in size step includes one selected from the group consisting of breaking, crushing, and cutting, or a combination of at least two thereof. In one embodiment, the first reducing in size step is performed by a crusher. By the first reducing in size step in one embodiment template particles having particle widths in the range from 1 to 10 mm are obtained. Further in one embodiment, by the first reducing in size step template particles having thicknesses in the range from 0.01 to 5 mm are obtained. Further in one embodiment, by the first reducing in size step template particles having lengths in the range from 1 to 10 mm are obtained.

The second reducing in size step in one embodiment includes milling the template particles obtained from the first reducing in size step. The milling is in one embodiment performed by an impact mill. In one embodiment, by a second reducing in size step a plurality of template particles is obtained. In one embodiment, the plurality of template particles is characterised by a particle size distribution having one selected from the group consisting of a $D_5$ in the range from 2 to 45 µm, in one embodiment from 7 to 40 µm, in one embodiment from 10 to 32 µm; a $D_{50}$ in the range from 120 to 200 µm, in one embodiment from 130 to 190 µm, in one embodiment from 135 to 175 µm; a $D_{95}$ in the range from 330 to 580 µm, in one embodiment from 350 to 550 µm, in one embodiment from 380 to 520 µm; and a fraction of particles having a particle size which is more than 315 µm which amounts to less than 5 wt.-%, in one embodiment less than 3 wt.-%, in one embodiment less than 1 wt.-%, each based on the weight of the total plurality of template particles; or a combination of at least two thereof. Therein, the $D_5$, $D_{50}$ and $D_{95}$ values are measured by laser diffraction. The fraction of particles having a particle size which is more than 315 µm is measured by sieving and subsequent weighing.

In one embodiment of the process a precursor including the template and the carbon obtained from carbonising the carbon source is reduced in size in a third reducing in size step. Therein, the precursor is in one embodiment reduced in size by milling. The milling is in one embodiment performed in one selected from the group consisting of an impact mill, a jet mill, a ball mill, and a roller mill, or a combination of at least two thereof. By reducing in size the above mentioned precursor in one embodiment a plurality of precursor particles is obtained.

In one embodiment, the third reducing in size step is performed in a fluidised bed or in a mixer or both. Therein, in one embodiment mixer is a paddle mixer.

The porous carbon product of one embodiment is reduced in size in a fourth reducing in size step. The fourth reducing in size step is in one embodiment performed after drying the porous carbon product, or prior to drying the porous carbon product, or both.

If the fourth reducing in size step is performed prior to drying the fourth reducing in size step in one embodiment includes wet-milling the porous carbon product. In one embodiment wet-milling is performed in a ball mill. In one embodiment after wet-milling the porous carbon product is classified in a wet state. In one embodiment classifying in a wet state is a centrifuging or a decanting or both. In one embodiment the porous carbon product is dried after wet-milling and prior to classifying.

If the fourth reducing in size step is performed after drying the fourth reducing in size step is in one embodiment performed using a jet mill or a roller mill or both. In one embodiment jet mill is an air jet mill. In one embodiment jet mill includes a compressed gas, wherein the compressed gas is characterised by a pressure in the range from below 10 bar, in one embodiment below 5 bar, in one embodiment below 3 bar. In one embodiment the jet mill includes at least two opposed jets. In one embodiment jet mill includes a classifying rotor.

Classifying the dried porous carbon product is in one embodiment performed using a sieve or a classifying rotor or both. In one embodiment is a classifying rotor. In one embodiment classifying rotor is a sifter. By sifting, the dried porous carbon product can in one embodiment be classified in shorter times or with less damages to the porous carbon product or both. For sieving the porous carbon product a sieve which does not include an ultrasonic generator is preferred in one embodiment.

Drying the porous carbon product prior to the fourth reducing in size step is in one embodiment performed using a paddle dryer, a roller dryer or a belt dryer or a combination of at least two thereof. Drying the porous carbon product after the fourth reducing in size step is in one embodiment performed using one selected from the group consisting of a spray dryer, a paddle dryer a roller dryer, and a belt dryer, or a combination of at least two thereof.

By classifying the porous carbon product in one embodiment oversized particles of the porous carbon product are separated from the rest of the porous carbon product. In one embodiment oversized particles are characterised by particle sizes of more than 300 µm, in one embodiment more than 200 µm, in one embodiment more than 100 µm.

Furthermore, by classifying the porous carbon product in one embodiment at least one mode of a multimodal particle size distribution of the porous carbon product is separated from the porous carbon product. After classifying a $D_{50}$ of a particle size distribution of the porous carbon product is in one embodiment in the range from 30 to 50 µm, in one embodiment from 32 to 48 µm, in one embodiment from 35 to 45 µm.

A contribution to the solution of at least one of the above objects is made a porous carbon product which is a plurality of carbon particles, wherein at least 40 wt.-%, in one embodiment at least 60 wt.-%, in one embodiment at least 90 wt.-%, of the carbon particles are a monolithic carbon body. In one embodiment, the carbon particles of the plurality of carbon particles are non-spherical. In one embodiment non-spherical carbon particles are flakes or rods or both. Further in one embodiment non-spherical carbon particles are characterised by a dimension ratio of at least 5, in one embodiment of at least 10. In one embodiment non-spherical carbon particles are characterised by a thickness in the range from 10 to 500 µm, in one embodiment from 20 to 100 µm, in one embodiment from 20 to 50 µm.

Applications

A contribution to achieving at least one of the above described objects is made by an article including the porous carbon product according to one embodiment. In one embodiment applications of the porous carbon product according to one embodiment are those which harness one or more advantageous properties of the porous carbon product, in one embodiment one or more selected from the group consisting of: improved purity, improved electrical conductivity, improved ionic conductivity, improved gas permittivity, improved adsorption and/or absorption, improved adsorption capacity and/or absorption capacity, increased specific surface area, pore hierarchy, and improved tunability of any thereof.

A contribution to achieving at least one of the above described objects is made by an active material, in one embodiment a catalyst, supported on the porous carbon product according to one embodiment. In one aspect of this embodiment, the catalyst is suitable for gas phase catalysis. In another aspect of this embodiment, the catalyst is suitable for liquid phase catalysis.

A contribution to achieving at least one of the above described objects is made by a fuel cell, in one embodiment a liquid fuel cell or a gas fuel cell, in one embodiment a gas fuel cell. In one embodiment fuel cells are suitable for use with one or more fuels selected from the group consisting of: hydrogen, a hydrocarbon, an alcohol, a ketone and an aldehyde; in one embodiment one or more selected from the group consisting of: hydrogen, an alcohol and a hydrocarbon; in one embodiment hydrogen. In one embodiment hydrocarbons in this context are alkenes and alkanes, in one embodiment alkanes. In one embodiment alkenes in this context are one or more selected from the group consisting of: ethene, propene and butene; in one embodiment one or more selected from the group consisting of ethene and propene; in one embodiment ethene. In one embodiment, alkanes in this context are one or more selected from this group consisting of: methane, ethane, propane and butane; in one embodiment one or more selected from the group consisting of methane and ethane; in one embodiment methane.

A contribution to achieving at least one of the above described objects is made by an electrical cell including the porous carbon product according to one embodiment. In one aspect of this embodiment the porous carbon material of one embodiment is at least partially included in one or more electrodes or in an electrolyte or in both one or more electrodes and an electrolyte. It is preferred in one embodiment for the porous carbon product to be present in or on a cathode. In one embodiment electrical cells in this context are secondary cells or primary cells, in one embodiment secondary cells. In one embodiment primary cells are one or more selected from the group consisting of: an alkaline battery, an aluminium ion battery, a lithium battery, a nickel oxyhydride battery and a zinc carbon battery. In one embodiment secondary cells are one or more selected from the group consisting of:

a lead-acid battery, a lithium ion battery, a lithium sulphur battery, a lithium titanate battery, a nickel cadmium battery, a nickel hydrogen battery, a nickel metal hydride battery and a nickel zinc battery; in one embodiment a lithium ion battery.

A further contribution to achieving at least one of the above describe objects is made by a device including the porous carbon product of one embodiment, the device being one or more selected from the group consisting of: a capacitor, in one embodiment a super-capacitor, an absorption and/or storage material for a liquid, an absorption and/or storage material for a gas, a carrier material for use in chromatography and a raw material for engineering and/or medical applications.

In one embodiment features according to an embodiment of a category according to one embodiment; for example, according to the process, the porous carbon material, the device and the use; are also in one embodiment in an embodiment of the other categories respectively if the other category relates to the same or similar term or entity.

Pore Structure

In one embodiment pore structure is one selected from the group consisting of a porosity, a pore size distribution, a total pore volume, and a geometric pore structure, or a combination of at least two thereof.

Reaction Zone

In one embodiment reaction zone is at least one flame. In one embodiment flame is a flame of a burner.

Agglomeration

In one embodiment, process step b) of the process according to one embodiment further includes an agglomeration of the particles of the first plurality of particles, thereby obtaining secondary particle as agglomerates of primary particles. The term first plurality of particles is used herein for the primary particles as well as for the secondary particles which are in one embodiment formed by agglomeration.

Sintering

The template is in one embodiment partially sintered, which means the template is not sintered throughout. Thus, a compact material with lowest possible porosity is in one embodiment not obtained.

Dimension Ratio

The dimension ratio of a particle is the ratio of the length of the particle to its thickness. The length of the particle is the length of the longest extent of the particle. The length of the particle extends along a first Cartesian direction. The width of the particle extends along a second Cartesian direction, wherein the width the length of the longest extent of the particle which is perpendicular to the length. Hence, the width is equal to or less than the length of the particle. The thickness of the particle extends along a third Cartesian direction, wherein the thickness is equal to or less than the width of the particle. Hence, the length, the width and the thickness are measured in directions which are perpendicular to each other, wherein the length is equal to or more than the width, which is equal to or more than the thickness. A particle is referred to being spherical if the width and the thickness of the particle do not differ by more than 20%, in one embodiment not more than 10%, in one embodiment not more than 5%, from the length of the particle. A particle is referred to as being a rod if the length of the particle is at least 2 times, in one embodiment at least 3 times, the width of the particle and at least 2 times, in one embodiment at least 3 times, the thickness of the particle. A particle is referred to as being a flake if the thickness of the particles is not more than 60%, in one embodiment not more than 50%, in one embodiment not more than 30%, of the length of the particle and not more than 60%, in one embodiment not more than 50%, in one embodiment not more than 30%, of the width of the particle.

In one embodiment, the porous carbon product has a laminar geometry, in one embodiment a flake or sheet geometry. In one embodiment porous carbon products of laminar geometry has a laminar plane, wherein the thickness in a directly perpendicular to the laminar plane is relatively small and the linear extension within the plane is relatively large. In one aspect of this embodiment, the porous carbon product has a first spatial extension which is the maximum linear extension in space, a second spatial extension being the maximum linear extension perpendicular to the first spatial extension and a third spatial extension being perpendicular to both the first spatial extension and the second spatial extension. The ratio of the third spatial extension to the second spatial extension is in one embodiment in the range from 1:5 to 1:100, in one embodiment in the range from 1:8 to 1:50, in one embodiment in the range from 1:10 to 1:20. The extension along the third spatial extension is in one embodiment in the range from 10 to 200 µm, in one embodiment in the range from 15 to 100 µm, in one embodiment in the range from 20 to 50 µm.

In one embodiment, the porous silicon dioxide material has a laminar geometry, in one embodiment a flake or sheet geometry. In one embodiment porous silicon materials of laminar geometry has a laminar plane, wherein the thickness in a directly perpendicular to the laminar plane is relatively small and the linear extension within the plane is relatively large. In one aspect of this embodiment, the porous silicon dioxide material has a first spatial extension which is the maximum linear extension in space, a second spatial extension being the maximum linear extension perpendicular to the first spatial extension and a third spatial extension being perpendicular to both the first spatial extension and the second spatial extension. The ratio of the third spatial extension to the second spatial extension is in one embodiment in the range from 1:5 to 1:100, in one embodiment in the range from 1:8 to 1:50, in one embodiment in the range from 1:10 to 1:20. The extension along the third spatial extension is in one embodiment in the range from 10 to 200 µm, in one embodiment in the range from 15 to 100 µm, in one embodiment in the range from 20 to 50 µm.

Electrochemical Device

In one embodiment electrochemical device is a battery or a fuel cell or both. In one embodiment battery is a rechargeable battery or a secondary battery or both. In one embodiment secondary battery is a lithium-ion-battery. In one embodiment lithium-ion-battery is one selected from the group consisting of a lithium-polymer-battery, a lithium-titanate-battery, a lithium-manganese-battery, a lithium-iron-phosphate-battery, a lithium-cobalt-oxide-battery, a lithium-cobalt-nickel-manganese-oxide-battery, a lithium-cobalt-manganese-nickel-aluminium-oxide-battery, (all combinations Ni Al Co Mn), a lithium-sulphur-battery, and a lithium-air-battery, or a combination of at least two thereof. In one embodiment lithium-ion-battery includes one selected from the group consisting of Ni, Al, Co and Mn, or a combination of at least two thereof in a Li-including electrode.

Test Methods

The following test methods are used in one embodiment. In absence of a test method, the ISO test method for the feature to be measured being closest to the earliest filing date of the present application applies. In absence of distinct measuring conditions, standard ambient temperature and pressure (SATP) as a temperature of 298.15 K (25° C., 77° F.) and an absolute pressure of 100 kPa (14.504 psi, 0.986 atm) apply.

Bulk Density

The bulk density measurements were performed according to DIN ISO 697 (1984).

Skeletal Density (Also Referred to as Material Density or Backbone Density)

The skeletal density measurements were performed according to DIN 66137-2. Between 0.49 g and 0.51 g of the powder sample were weighed in the sample cell and dried at 200° C. under vacuum for 1 h prior to the measurement. The mass after drying was used for the calculation. A Pycnomatic ATC Helium Pycnometer from Thermo Fisher Scientific, Inc. was used for the measurement, employing the "small" sample volume and the "small" reference volume. The pycnometer is calibrated monthly using the "extra small" sphere with a well-known volume of around 3 cm$^3$. Measurements were performed using Helium with a purity of 4.6, at a temperature of 20.00° C. and a gas pressure of approx. 2 bar, according to the DIN standard and the SOP of the device.

Mercury Porosimetry (Pore Size and Pore Volume)

The specific pore volume for different pore sizes, the cumulative pore volume, and the porosity were measured by mercury porosimetry. The mercury porosimetry analysis was performed according to ISO15901-1 (2005). A Thermo Fisher Scientific PASCAL 140 (low pressure up to 4 bar) and a PASCAL 440 (high pressure up to 4000 bar) and SOLID Version 1.6.3 (Nov. 26, 2015) software (all from Thermo Fisher Scientific, Inc.) were calibrated with porous glass spheres with a modal pore diameter of 140.2 nm and pore volume of 924.4 mm$^3$/g (ERM-FD122 Reference material from BAM). During measurements the pressure was increased or decrease continuously and controlled automatically by the instrument running in the PASCAL mode and speed set to 8 for intrusion and 9 for extrusion. The Washburn method was employed for the evaluation and the density of Hg was corrected for the actual temperature. Value for surface tension was 0.48 N/m and contact angle 140°. Sample size was between about 25 and 80 mg. Before starting a measurement, samples were heated to 150° C. in vacuum for 1 hour.

BET-SSA/Specific Surface Area and BJH-BET (Pore Size, Pore Volume)

BET measurements to determine the specific surface area (BET-SSA) of particles are made in accordance with DIN ISO 9277:2010. A NOVA 3000 (from Quantachrome) which works according to the SMART method (Sorption Method with Adaptive dosing Rate), is used for the measurement. As reference material Quantachrome Alumina SARM Catalog No. 2001 (13.92 m$^2$/g on multi-point BET method), and SARM Catalog No. 2004 (214.15 m$^2$/g on multi-point BET method) available from Quantachrome are used. Filler rods are added to the reference and sample cuvettes in order to reduce the dead volume. The cuvettes are mounted on the BET apparatus. The saturation vapour pressure of nitrogen gas (N2 4.0) is determined. A sample is weighed into a glass cuvette in such an amount that the cuvette with the filler rods is completely filled and a minimum of dead volume is created. The sample is kept at 200° C. for 1 hour under vacuum in order to dry it. After cooling the weight of the sample is recorded. The glass cuvette containing the sample is mounted on the measuring apparatus. To degas the sample, it is evacuated at a pumping speed selected so that no material is sucked into the pump to a final pressure of 10 mbar.

The mass of the sample after degassing is used for the calculation. For data analysis the NovaWin 11.04 Software is used. A multi-point analysis with 5 measuring points is performed and the resulting specific surface area (BET-SSA) given in m$^2$/g. The dead volume of each sample cell is determined once prior the measurement using Helium gas (He 4.6, humidity 30 ppmv). The glass cuvettes are cooled to 77 K using a liquid nitrogen bath. For the adsorptive, $N_2$ 4.0 with a molecular cross-sectional area of 0.162 nm$^2$ at 77 K is used for the calculation.

The mesopore size distribution and mesopore volume (BET-BJH) are derived from the desorption isotherm by means of the BJH pore size model according to ISO15901-2 at relative pressures of more than 0.35.

The empirical t-plot methodology is used according to ISO15901-3:2007 to discriminate between contributions from micropores and remaining porosity at relative pressures of more than 0.1 (that is, mesoporosity, macroporosity and external surface area contributions) and to calculate the micropore surface and micropore volume. The low pressure isotherm data points up to a cut-off p/p$_0$, typically up to 0.1 p/p$_0$ are selected to determine the linear section of the t-plot. Data point selection is validated by obtaining a positive C constant. The micropore volume is determined from the ordinate intercept. The micropore specific surface area can be calculated from the slope of the t-plot.

Tap Density

The Tap density was measured according to DIN EN ISO 787-11 (1995).

Aspect Ratio/Particle Dimensions

In accordance with ISO 9276-1, ISO 9276-6 and ISO13320 the morphology and form of the particles was analysed using a QICPIC-picture analysis system (Sympatec GmbH System-Partikel-Technik Germany). Dry dispersion of the particles was performed using pressurised air with the RODOS/L (0.50 63.0 mm) unit attached to the QICPIC. The measuring area was set to M6 which covers particles with a diameter of about 5 to 1705 µm. Additional parameters were: picture frequency=450 Hz, conveying rate VIBRI=20%, funnel height=2 mm, inner diameter of dispersion tube=4 mm, pressure 1 bar. EQPC (Diameter of a circle having the same area as the projection area of the particle), FERET_MIN (minimum diameter or breadth of a particle) and FERET_MAX (maximum diameter or width of a particle) were determined. The aspect ratio was calculated according to the formula FERET_MIN/FERET_MAX. The aspect ratio is calculated by using the ×50 values of the FERET_MAX and FERET_MIN distribution of a sample.

Particle Size Distribution

Laser diffraction ($D_{10}$, $D_{50}$, $D_{90}$):

For particle size determination of the particles a laser diffraction method was used according to ISO Standard 13320. A Mastersizer 3000 from Malvern equipped with a He—Ne Laser (wave length of 632.8 nm with a maximum power of 4 mW) and a blue LED (wave length of 470 nm with a maximum power of 10 mW) and wet dispersing unit (Hydro MV) was employed for the measurements performed at ambient temperature of 23° C. A mixture of isopropanol and deionized water (50%/50%) was used as measurement medium. The mixture was degassed in the dispersing unit by using the built-in stirrer at 3500 rpm and ultrasonicate at maximum power for 10 seconds. The sample material is prepared as a concentrated dispersion in 100% isopropanol (40 mL). The quantity of material is sufficient to create a homogeneous mixture after the ultrasonic finger mixing for 30 seconds. The sample is added to the dispersing unit drop-wise with a pipette until the obscuration value is between 3-7%. The values of $D_{10}$, $D_{50}$ and $D_{90}$ (volume based) were determined using the Malvern software Mastersizer 3000 Software 3.30, and a form factor of 1. The Fraunhofer theory is used for samples where the particles are >10 µm and the Mie theory is applied to materials where the particles are <10 µm.

Sieving (Weight Fraction Having Particle Size of More than 315 µm):

Sieving for weight fractions with particles having a size larger than 315 µm were performed carefully with a sieve with an Air Jet RHEWUM LPS 200 MC sieving machine (RHEWUM GmbH) equipped with a sieve with 315 µm openings from Haver and Wicker (HAVER & BOECKER OHG).

Impurity Content

The impurity content of the porous carbon material is performed by Inductively Coupled Plasma Optical Emission Spectrometry (ICP-OES) analogue to DIN EN ISO 11885. Prior to measurement, the porous carbon sample is ashed and digested in such a manner that no solid residue remains after digestion of the ash. This ashing and digesting process is available commercially from the analytics service provider Wolfener Analytik GmbH, Bitterfeld-Wolfen, Germany according to test method documented as "Totalaufschluss-Veraschung" of Apr. 22, 2015. Approximately 50 g of the porous carbon material is used per analysis. The average impurity value of three analyses is reported ppm by weight (mg/kg).

EXAMPLES

Embodiments are now explained in more detail by examples and drawings given by way of example which do not limit it. The figures are not true to scale if not given otherwise, for example, by providing a scale.

Production of the Inventive Porous Carbon Product

The porous carbon product is obtained using a device according to FIG. 4 below. Therein, oxygen, hydrogen and OMCTS are fed into the burners in order to obtain a bright light white flame. The steps of heat treatment of the silicon dioxide material, impregnation with carbon source, carbonisation and removal of the template are described below.

Production of the First Comparative Porous Carbon Product

The porous carbon product is obtained by a process as for the inventive example except that the step in which the porous silicon dioxide material is heat treated is omitted.

Production of the Second Comparative Porous Carbon Product

The porous carbon product is obtained by a process as for the inventive example except that 50 layers of silicon dioxide are deposited on the substrate surface rather that one. All 50 layers are applied to the substrate surface before all being removed at the same time with the air blade.

Heat Treatment of the Template

The template is heat treated at a temperature of 1200° C. for 16 hours to adapt the pore structure.

Reducing the Size of the Heat Treated Porous Silicon Dioxide

The heat treated porous silicon dioxide is a powdery mass which is reduced in size by means of an impact mill (Noll Type DemiNo2500, rotation speed 90%, throughput 50 kg/h, PEK-filter 20 m$^2$, needle-felt, fan 90%). The thus obtained particles are characterised by particle sizes in the range from 25 to 350 µm.

Impregnation with Carbon Source

In the inventive example, a coal tar pitch (Carbores P15 available from Rutgers, having a low viscosity range from 320 to 350° C.) is applied to the surface of the porous silicon dioxide material while it is still on the substrate surface. The temperature of the porous silicon dioxide material is maintained at a temperature of 350° C. to allow the coal tar pitch to melt and impregnate the pores of the porous silicon dioxide material.

In the comparative example, the removed porous silicon dioxide material is first reduced in size by milling to give flakes with a thickness of 20 µm and extension in the plane of 500 µm. The flakes of template are then mixed with the P15 powder in a ratio of 2 parts silicon dioxide to 1 part P15 powder by weight.

Carbonisation

Figure 7:
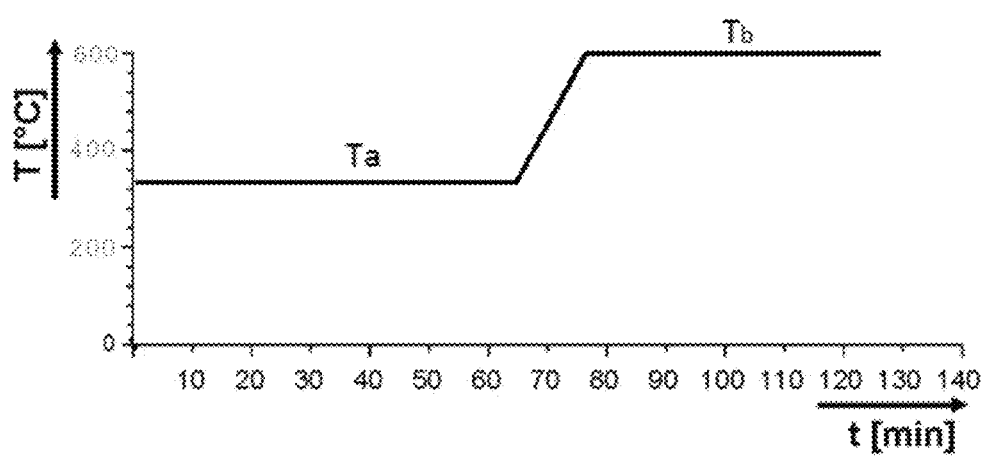
FIG. 7 illustrates a diagram illustrating a heating profile applied in process step g) of another process according to one embodiment for the production of a porous product.

Subsequently to the infiltration process, the temperature is further increased to about 700° C. Finishing the carbonisation, a composite body containing porous $SiO_2$ particles which are at their inner (in the pores) and outer sides coated with a porous carbon is obtained. At least 70 vol.-% of the pores of the carbon are meso-pores having pore sizes in the range from 10 to 150 nm. A diagram of the heating which is performed for infiltration/impregnation and carbonisation is illustrated in FIG. 7.

Reducing in Size the Composite Body/Precursor

The composite body is a slightly agglomerated mass which is gently reduced in size by means of an hammer mill (Alpine Type 63/50HA, Sieve 6 mm round hole, rotation speed 12%, throughput 100 kg/h, PEK-filter 20 m$^2$, needle-felt, fan 90%). The thus obtained particles are characterised by particle sizes in the range from 25 to 350 µm.

Removal of the Template

The $SiO_2$ template material is removed from the composite particles by introducing the body into a HF bath. After the $SiO_2$ particles have been removed by etching, the remaining material is rinsed with water, dried and reduced in size in order to obtain flakes of porous carbon. The structure of the porous carbon is substantially a negative of the original template material. The carbon material includes pores which stem from the removal of the template material, as well as pores which stem from the secondary agglomerate structure of the template. Where the primary particles of the template were before, meso-pores are present in the carbon material; and where the sintering necks between the secondary template particles were before, macro-pore channels interconnect the meso-pore regions of the carbon material. The carbon material is referred to as having a hierarchic pore structure. A network of interconnected channels (macropores) runs through the meso-pore containing carbon material.

Width of Pore Size Distribution

The pore size distribution of the porous carbon product from the inventive example and from comparative example 1 were determined using the test method. The width of the distribution in each case was determined by 2 measures. First, the width was determined as the difference between $d_{10}$ and $d_{90}$. Second, the width was determined as the ratio of $d_{10}$ to $d_{90}$. The results are illustrated in table 1.

Silicon Dioxide Product

| Example | Number of layers applied to the substrate | Difference between $d_{90}$ and $d_{10}$ | ratio d90:d10 | Number of modes in the range 10 to 10000 nm |
|---|---|---|---|---|
| Inventive | 1 | 550 | 7:1 | 1 |
| Comparative 1 | 1 | 5000 | 100:1 | 2 |

TABLE 1

| Example | Number of layers applied to the substrate | Difference between $d_{90}$ and $d_{10}$ | ratio d90:d10 | Number of modes in the range 10 to 10000 nm |
|---|---|---|---|---|
| Inventive (pitch) | 1 | 550 | 16:1 | 1 |
| Inventive (sugar) | 1 | 370 | 15:1 | 1 |
| Comparative 1 (pitch) | 1 | 5100 | 120:1 | 2 |
| Comparative 1 (sugar) | 1 | 5000 | 115:1 | 2 |

As can be seen from table 1, the inventive setup allowed a more tightly controlled pore size distribution.

Width of Flake Thickness Distribution

The thickness distribution of the porous carbon product from the inventive example and from comparative example 2 were determined as the distribution of the magnitude of the smallest dimension of the particles. The results are illustrated in table 2

TABLE 2

| Example | Number of layers applied to the substrate | Mean flake thickness |
|---|---|---|
| Inventive | 1 | 20 µm |
| Comparative 2 | 50 | 80 µm |

As can be seen from table 2, the inventive setup allowed a lower mean thickness of the flakes to be achieved.

FIG. 1 illustrates a flow chart diagram of a process 100 according to one embodiment for the production of a porous silicon dioxide material. The process 100 includes a process step a) 101 of feeding a feed material composition of oxygen, hydrogen and octamethylcyclotetrasiloxane (OMCTS) into a flame 305 of a flame hydrolysis burner 304. In a process step b) 102 the feed material composition in the flame 305 is reacted into a plurality of primary particles 601 of $SiO_2$ by a hydrolysis reaction. The primary particles 601 agglomerate to form secondary particles 602. These secondary particles 602 are deposited on a substrate surface 302 of a substrate 301 in a process step c) 103. Thereby, a porous silicon dioxide material 309 in form of one layer is obtained. In a process step d) 104 the layer of the porous silicon dioxide material 309 is detached and removed from the substrate surface 302. Thereby, a removed porous silicon dioxide material 403 is obtained. Adapting a pore structure of the removed porous silicon dioxide material 403 represents a process step e) 105 of the process 100. The process steps a) to e) are described in more detail below in the context of FIG. 4. The process 100 is further illustrated by FIG. 10.

Figure 2:
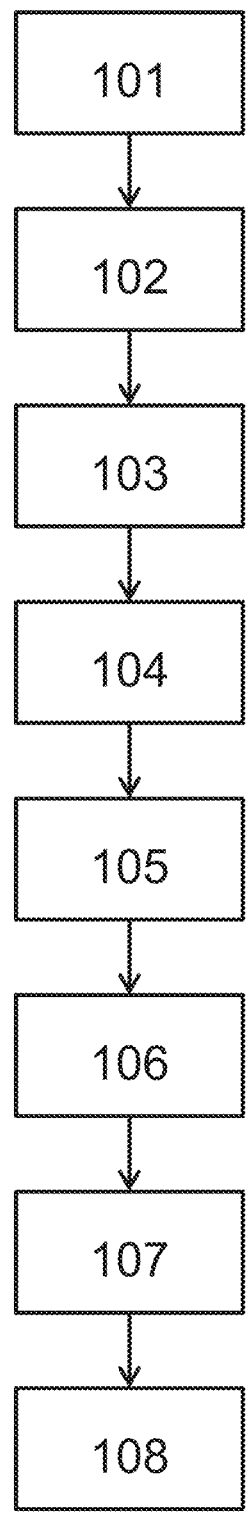
FIG. 2 illustrates a flow chart diagram of another process according to one embodiment for the production of a porous product.

FIG. 2 illustrates a flow chart diagram of another process 100 according to one embodiment for the production of a porous carbon product. The process 100 according to FIG. 2 includes process steps a) 101 to h) 108. The process steps a) 101 to e) 105 are the same as in the process 100 according to FIG. 1. The process 100 according to FIG. 2 further includes the process step f) 106 of impregnating the template with a carbon source 606 which is a mesophase pitch. Therein, particles of the template are dry mixed with mesophase pitch particles. Subsequently, the mixture is heated in order to melt the mesophase pitch. The molten pitch infiltrates the pores of the template. In process step g) 107 the mixture is heated to a higher temperature of about 650° C. in order to carbonise the pitch. Thereby, a precursor including carbon and the template is obtained. In process step h) 108, the template is removed from the precursor by etching in an HF bath. Consequently, a porous carbon product is obtained.

Figure 3:
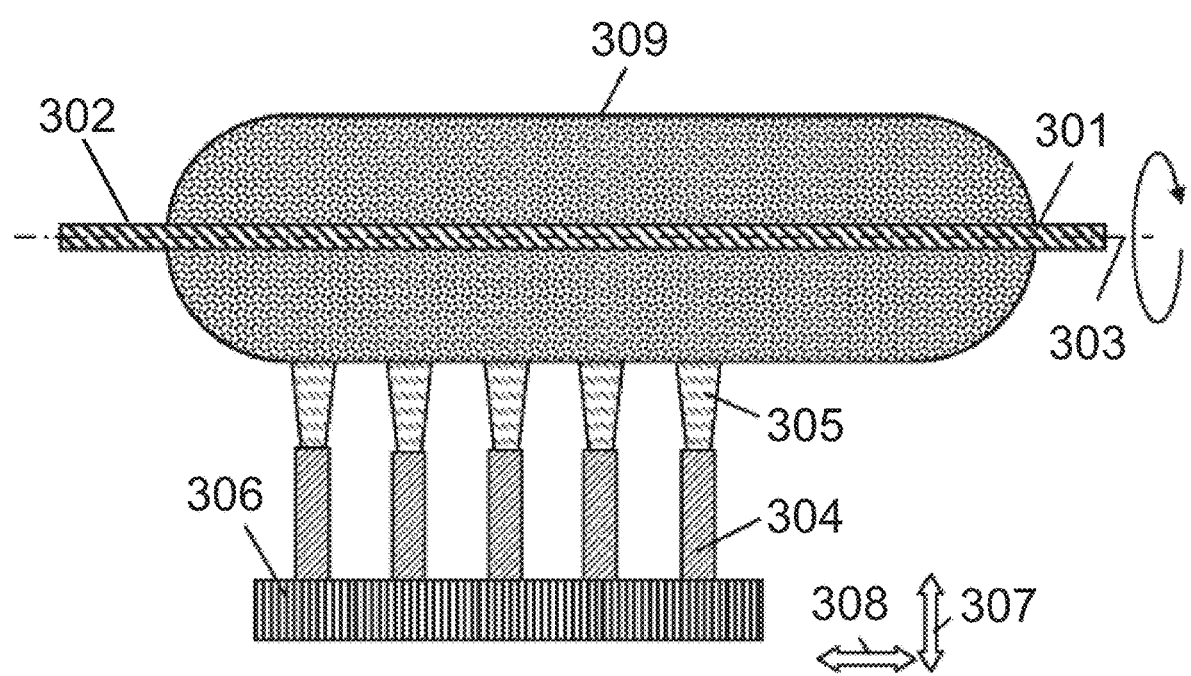
FIG. 3 illustrates a cross-sectional scheme of a setup for performing the process steps a) to c).

FIG. 3 illustrates a cross-sectional scheme of a setup for performing the process steps a) (101) to c) (103) of a process 100 according to one embodiment for the production of a porous product 309. Therein, the porous product is a $SiO_2$-soot body. The setup includes a substrate 301 which is a tube 301 made of aluminium oxide. Along the tube 301 a row of flame hydrolysis burners 304 is arranged. The flame hydrolysis burners 304 are arranged on a single burner feed block 306. The burner feed block 306 periodically moves back and forth between two turning points in a direction 308 parallel to a longitudinal axis 303 of the tube 301. Furthermore, the burner feed block 306 can be shifted in a direction 307 perpendicular to the longitudinal axis 303. The flame hydrolysis burners 304 are made from fused silica. A distance between two neighbouring flame hydrolysis burners 304 is 15 cm. Pointing towards the substrate surface 302, each flame hydrolysis burner 304 causes a flame 305. The flames 305 form reaction zones 305 for a hydrolysis reaction. By means of the flame hydrolysis burners 304 $SiO_2$-soot particles are deposited on the substrate surface 302. Therein, primary particles 601 of diameters on a nm-scale are formed in the flames 305. The primary particles 601 move towards the substrate surface 302, wherein primary particles 601 agglomerate to form about spherical secondary particles 602. Due to the random nature of agglomeration, the secondary particles 602 include different numbers of primary particles 601 and hence illustrate a rather broad secondary particle size distribution. Within the secondary particles 602, between the primary particles 601, rather small cavities and pores are present (nm-scale). The cavities and pores are called meso-pores. Between the secondary particles 602 macro-pores having a clearance around 400 to 1000 nm are present. During the deposition process, the tube 301 rotates around its longitudinal axis 303 as depicted by an arrow in FIG. 3. Being deposited on the rotating substrate surface 303, the $SiO_2$-soot particles form several layers, one layer per revolution of the rotating substrate 301. Thereby, a body of a porous silicon dioxide material 309 is obtained in the substrate 301. The final outer diameter of the body is about 400 mm. An average thickness of the individual layers of the porous silicon dioxide material 309 is about 50 μm. A feed composition which is fed into the flame hydrolysis burners 304 includes oxygen, hydrogen and octamethylcyclotetrasiloxane (OMCTS). An amplitude of the periodic back and forth movement of the burner feed block 306 is two distances of flame hydrolysis burners 304 (30 cm). While the $SiO_2$-soot particles are deposited on the substrate surface 302, the latter has a temperature of about 1200° C. By the above described soot deposition process a tube (soot tube) of the porous silicon dioxide material 309 is obtained. The soot tube has a length of 3 m, an outer diameter of 400 mm and an inner diameter of 50 mm. As the temperature is kept relatively low during formation of the soot tube, the porous silicon dioxide material 309 is characterised by an average relative density of 22% based on the density of fused silica (2.21 $g/cm^3$). Due to the low bulk density of the porous silicon dioxide material 309, the material can be easily reduced in size. Reducing in size the porous silicon dioxide material 309 often involves a partial delamination of the layers of the porous silicon dioxide material 309. Thus, the porous silicon dioxide material 309 can be reduced in size into non-spherical flakes having a thickness in the range from 20 to 50 μm. The porous silicon dioxide material 309 illustrates an anisotropic mass distribution and a so called hierarchic pore structure which means that the porous silicon dioxide material 309 includes meso-pores which are connected by macro-pores forming channels.

Figure 4:
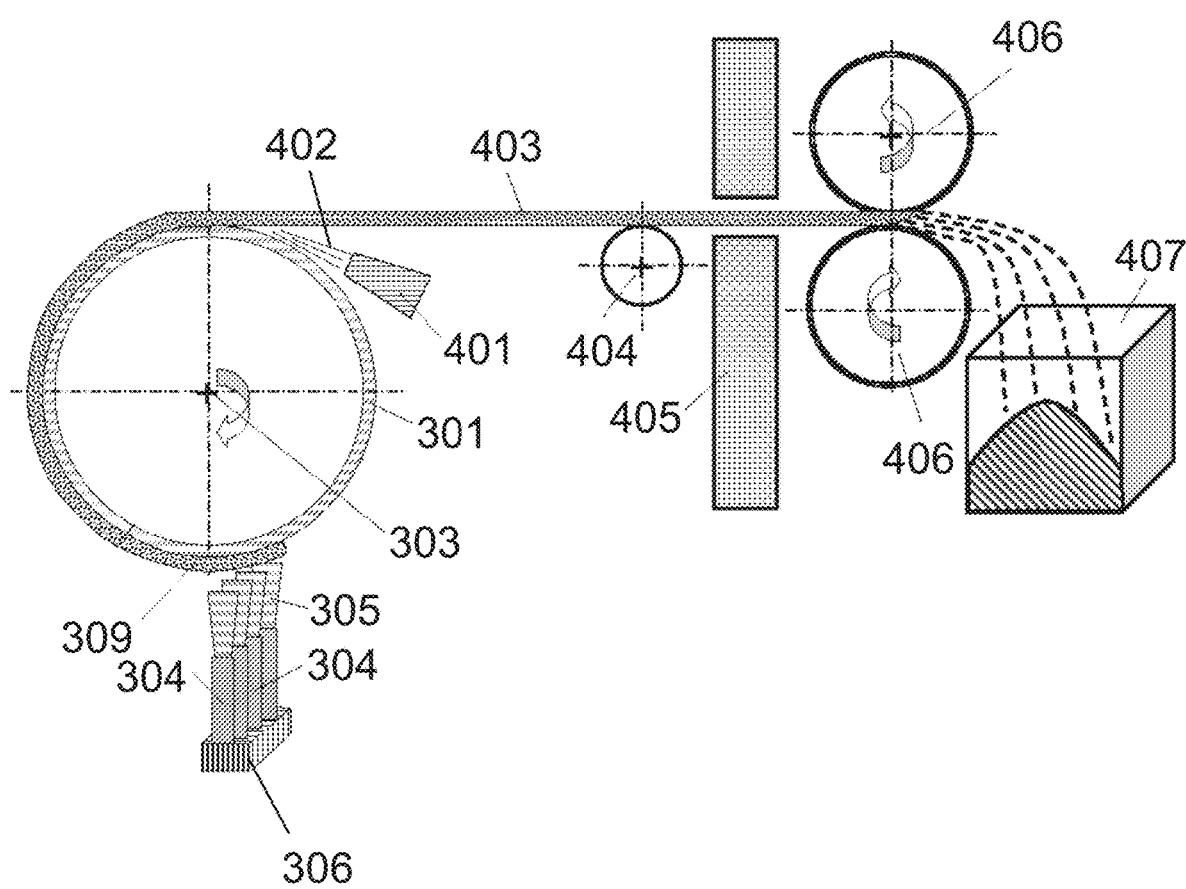
FIG. 4 illustrates a cross-sectional scheme of a setup for performing the process according to FIG. 1.
Figure 9A:
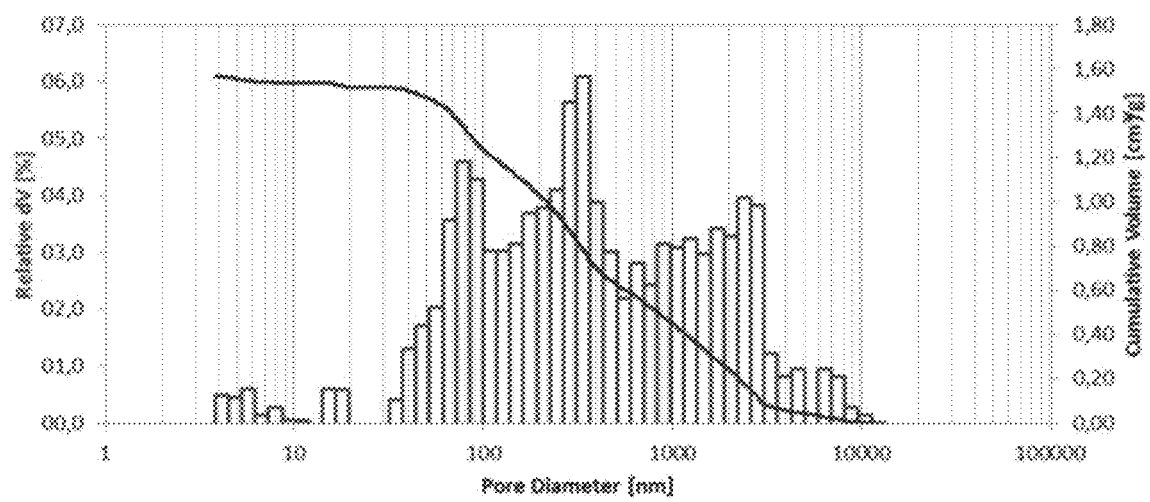
FIG. 9a illustrates a diagram illustrating the pore structure of a removed porous silicon dioxide material according to a process according to one embodiment.
Figure 9B:
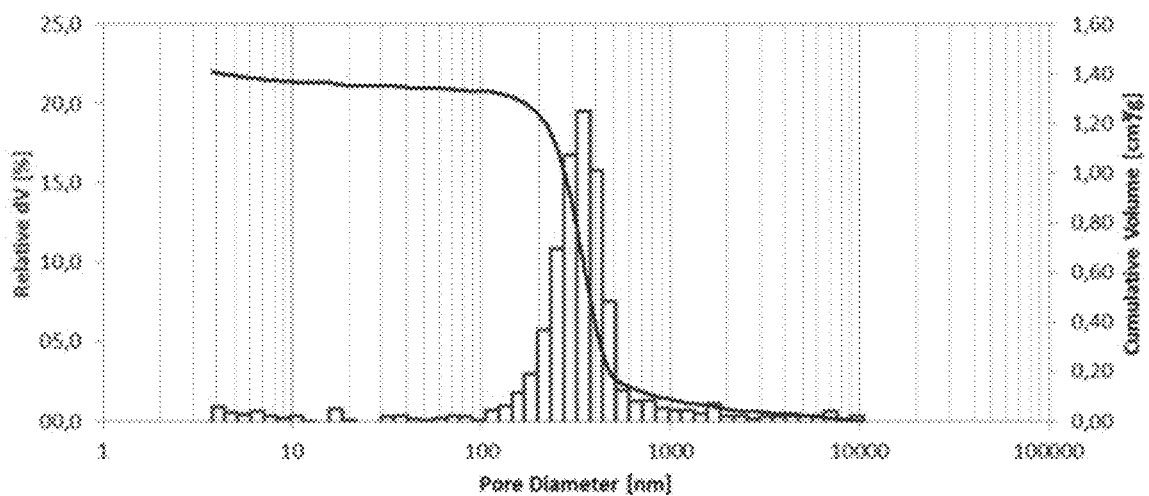

FIG. 4 illustrates a cross-sectional scheme of a setup for performing the process 100 according to FIG. 1. The setup includes a substrate 301 in form of a drum 301 which rotates around its longitudinal axis 303. The drum 301 consists of a body made from stainless steel. The drum 301 has an outer diameter of 30 cm and a length of 50 cm. On a substrate surface 302, which is a lateral surface of the drum 301, one layer of a porous silicon dioxide material 309 of $SiO_2$ is deposited. In order to obtain the porous silicon dioxide material 309, flame hydrolysis burners 304 are applied. The flame hydrolysis burners 304 are arranged in a row along a direction parallel to the longitudinal axis 303 of the drum 301. The flame hydrolysis burners 304 are arranged on a single burner feed block 306. The burner feed block 306 performs a periodic forth and back movement parallel to the longitudinal axis 303. A feed composition which is fed into the flame hydrolysis burners 304 includes oxygen, hydrogen and octamethylcyclotetrasiloxane (OMCTS). Due to a hydrolysis reaction primary particles 601 are formed in a reaction zone formed from flames of the flame hydrolysis burners 304 which are pointed towards the substrate surface 302. The primary particles 601 of diameters in the nm-range move towards the substrate surface 302, wherein primary particles 601 agglomerate to form about spherical secondary particles 602. Due to the random nature of agglomeration, the secondary particles 602 include different numbers of primary particles 601 and hence illustrate a rather broad secondary particle size distribution. Within the secondary particles 602, between the primary particles 601, rather small cavities and pores are present (nm-scale). The cavities and pores are called meso-pores. Between the secondary particles 602 macro-pores having a clearance around 400 to 1000 nm are present. The porous silicon dioxide material 309 formed by deposition of the secondary SiO$_2$ particles on the substrate surface 309 is characterised by a specific surface area according to BET of about 100 m$^2$/g. The porous silicon dioxide material 309 forms a smooth layer of constant thickness on the substrate surface 302. A tangential velocity of the drum 301 and a rate of deposition are adjusted such that the layer of the porous silicon dioxide material 309 has a length of 40 cm and a thickness of about 35 μm. The thickness is illustrated exaggerated in FIG. 4. The flame hydrolysis burners 304 being directed towards the substrate 301, cause the an outer surface of the porous silicon dioxide material layer to have a temperature of about 1200° C. during the above described soot deposition process. This heating action of the flame hydrolysis burners 304 leads to a partial pre-sintering of the secondary particles 602 on the substrate surface 302. Thereby, the secondary particles 602 form sintering necks 603 which interconnect each secondary particle to the other ones, thereby forming the porous silicon dioxide material layer. The porous silicon dioxide material layer is characterised by an average relative density of 22% based on the density of fused silica (2.21 g/cm$^3$). After slightly more than half a revolution of the drum 301, the porous silicon dioxide material layer experiences the action of an air blower 401. The air blower 401 directs an air stream 402 on a side of the porous silicon dioxide material layer facing towards the substrate surface 302. Due to the air stream 402, also known as air knife 402, the porous silicon dioxide material 309 is detached and removed from the substrate surface 302. Subsequently, the removed porous silicon dioxide material 403 is transported via a transport roller to a reducing in size zone. The reducing in size zone is separated from the above described setup by a shielding 405. The shielding 405 is a wall having an opening through which the removed porous silicon dioxide material 403 is transported. In the reducing in size zone the removed porous silicon dioxide material 403 is broken between two rotating rollers 406 which rotate in opposite directions. Therefore, the removed porous silicon dioxide material 403 in form of a removed layer is fed into a gap between the rotating rollers 406. A width of the gap equals the thickness of the removed porous silicon dioxide material layer. Surfaces of the rotating rollers include profiles which are oriented in a longitudinal direction of the rotating rollers 406 respectively. By the action of the rotating rollers 406, the removed porous silicon dioxide material 403 is reduced in size into non-spherical particles of about the same size. A thickness of the non-spherical particles, in one embodiment flakes, is about 45 μm. The particles are fed into a furnace chamber 407. In the furnace chamber 407 the particles of the removed porous silicon dioxide material 403 are thermally treated in order to decrease a width of their pore size distribution. A pore size distribution of the particles prior to the thermal treatment is illustrated in FIG. 9a. In the furnace chamber 407 the removed porous silicon dioxide material 403 is heated at a rate of 6° C./min to 1200° C. The temperature is kept constant for 500 min. Subsequently, the temperature is decreased to room temperature by cooling the porous silicon dioxide material. Due to the thermal treatment, an adapted porous silicon dioxide material is obtained. A pore size distribution of the adapted porous silicon dioxide material is illustrated in FIG. 9b. Comparing the widths of the pore size distributions in the FIGS. 9a and 9b, it can be seen that the width of the pore size distribution is decreased due to the thermal treatment which is process step e) 105 of the process 100 according to one embodiment.

Figure 5:
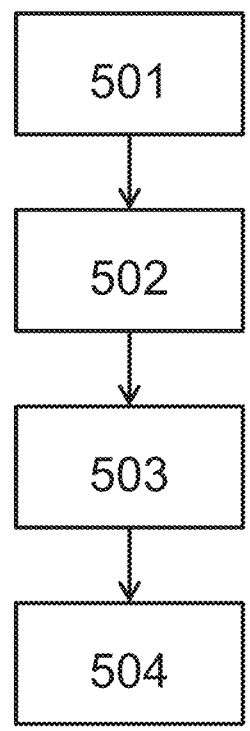
FIG. 5 illustrates a flow chart diagram of a process according to one embodiment for the production of a porous carbon material.

FIG. 5 illustrates a flow chart diagram of a process 500 according to one embodiment for the production of a porous carbon material 800. The process 500 includes process steps a. 501 to d. 504. In the process step a. a template 309 is provided. The reducing in size is characterised by a pore size distribution having a D$_{10}$ of 50 nm, a D$_{50}$ of 600 nm and a D$_{90}$ of 3500 nm. The reducing in size 309 can be obtained from the process 100 according to one embodiment. In the process step b. 502 of the process 500 the reducing in size 309 is impregnated with a carbon source 606 as described in the context of process step f) 106 of the process 100 according to FIG. 2. Subsequently, in the process step c. 503 the carbon source 606 is carbonised as described in the context of process step g) 107 of the process 100 according to FIG. 2, thereby obtaining a precursor of the reducing in size 309 and carbon. In the process step d. 504 the template 309 is removed by etching as explained in the context of process step h) 108 of the process 100 according to FIG. 2. Thereby, the porous carbon product 800 is obtained.

Figure 6A:
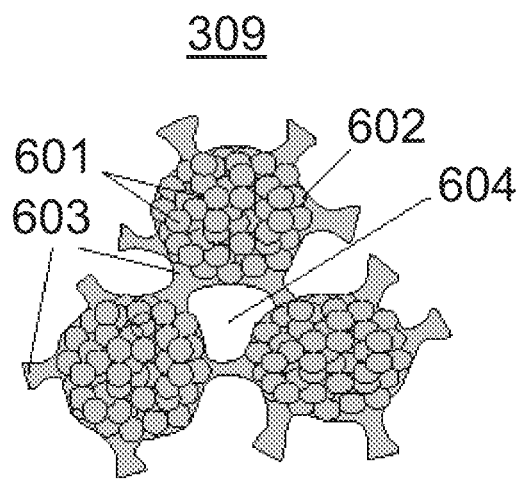
FIG. 6a illustrates a schematic view of a section of a porous silicon dioxide material according to one embodiment.

FIG. 6a illustrates a schematic view of a section of a porous material 309 according to one embodiment. The porous material includes primary particles 601 which are agglomerated to secondary particles 602. The secondary particles 602 are connected to each other by sintering necks 603. The porous material 309 is obtained on the substrate surface 302 of FIG. 4 as described above. The porous material 309 in FIG. 6a can be the porous silicon dioxide material 309 which is obtained in the process 100, as well as the template 309 provided in process step a. 501 of the process 500 according to one embodiment for the production of a porous carbon product 800.

Figure 6B:
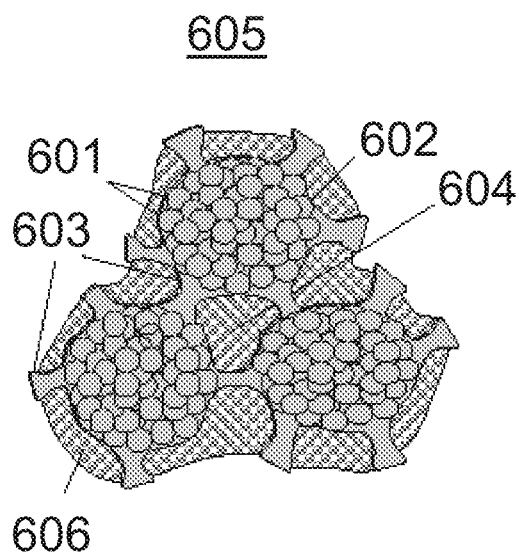
FIG. 6b illustrates a schematic view of a section of a precursor including the porous silicon dioxide material and a carbon source.

FIG. 6b illustrates a schematic view of a section of a precursor including the template 309 and a carbon source 606. The precursor is obtained in process step b. 502 of the process 500 according to one embodiment for the production of a porous carbon material 800, or in process step f) 106 of the process 100 according to one embodiment for the production of a porous product. Therein, the material illustrated in FIG. 6a is impregnated with the carbon source 606 which is sucrose.

FIG. 7 illustrates a diagram illustrating a heating profile applied in process steps c) and d) of another process 100 according to one embodiment for the production of a porous product using a coal tar pitch carbon source. Therein, the temperature T is illustrated in ° C. over time t in minutes. A temperature Ta between 300° C. and 400° C. is held to allow molten coal tar pitch to impregnate the porous silicon dioxide material. A temperature around 600° C. is held to allow carbonisation of the carbon source.

Figure 8:
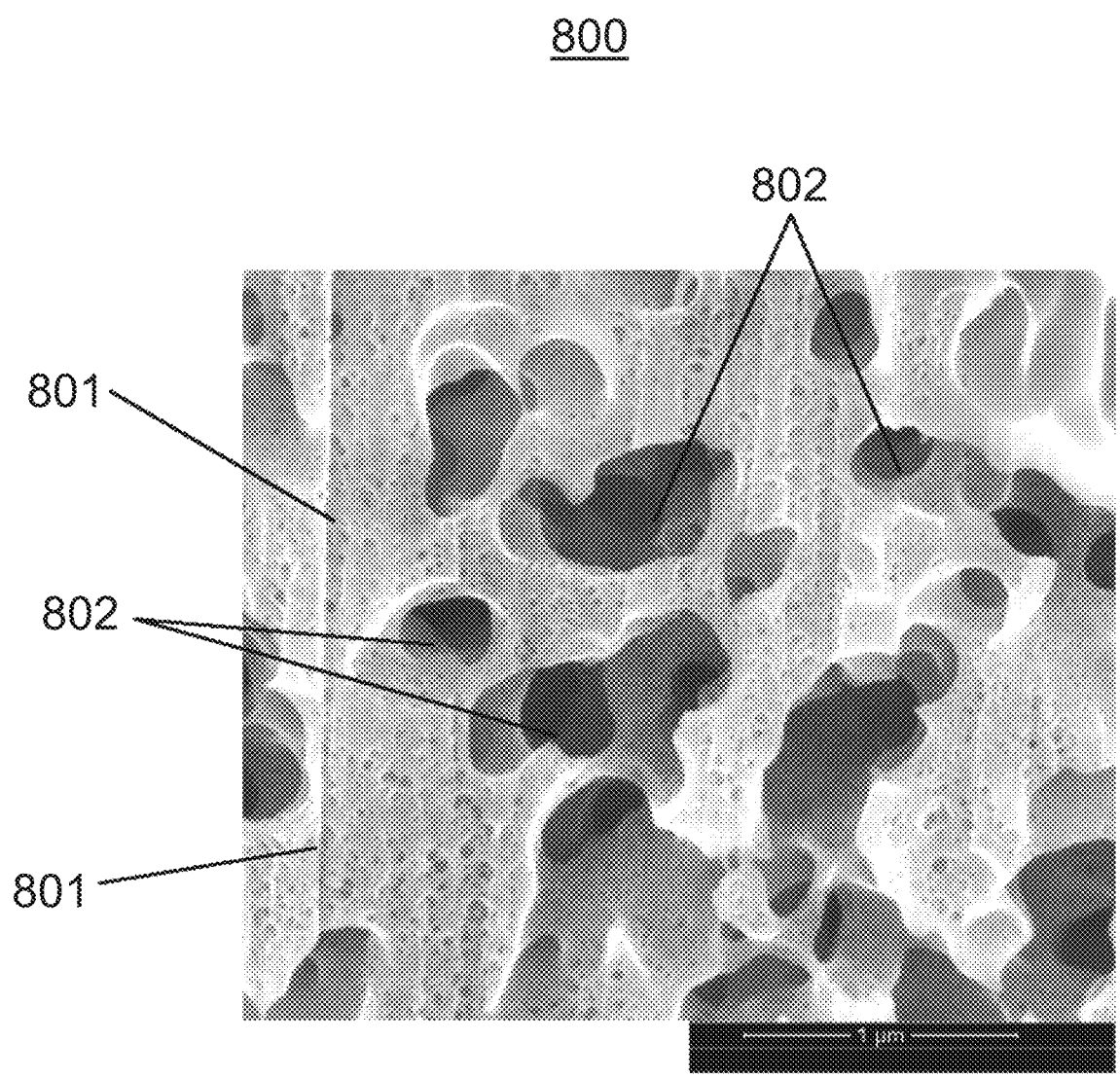
FIG. 8 illustrates a SEM-record of a porous carbon material according to one embodiment.

FIG. 8 illustrates a SEM-record of a porous carbon material 800 according to one embodiment. An inner structure of the porous carbon material 800 can be seen. The inner structure includes a plurality of interconnected pores and cavities of different sizes. A sponge-like carbon body illustrates rather fine meso-pores 801. The sponge-like body is penetrated by larger macro-pores 802 which form channels between the different meso-pore-containing regions. A specific surface area according to BET is about 450 m$^2$/g.

FIG. 9a illustrates a diagram illustrating the pore structure of a removed porous silicon dioxide material 403 according to process 100 according to one embodiment. The removed porous silicon dioxide material 403 is the one obtained by the process 100 described in the context of FIG. 4. The left-hand side of the diagram provides the pore volume in % based on the overall pore volume of the removed porous silicon dioxide material 403. The bars in the diagram illustrate the pore volume for different pore diameters. The right-hand side of the diagram gives the cumulative pore volume in cm³/g removed porous silicon dioxide material 403. The graph illustrates values of the cumulative pore volume for different pore diameters.

FIG. 9b illustrates a diagram illustrating the pore structure of porous silicon dioxide material obtained as described above in the context of FIG. 4 from the removed porous silicon dioxide material 403 of FIG. 9a. The left-hand side of the diagram provides the pore volume in % based on the overall pore volume of the porous silicon dioxide material. The bars in the diagram illustrate the pore volume for different pore diameters. The right-hand side of the diagram gives the cumulative pore volume in cm³/g adapted porous silicon dioxide material. The graph illustrates values of the cumulative pore volume for different pore diameters. Comparing FIGS. 9a and 9b it can be seen that the porous silicon dioxide material has a narrower pore size distribution than the removed porous silicon dioxide material 403. Moreover, the pore size distribution of the porous silicon dioxide material contains only one mode, whereby the pore size distribution of the removed porous silicon dioxide material includes at least 3 modes.

Figure 10:
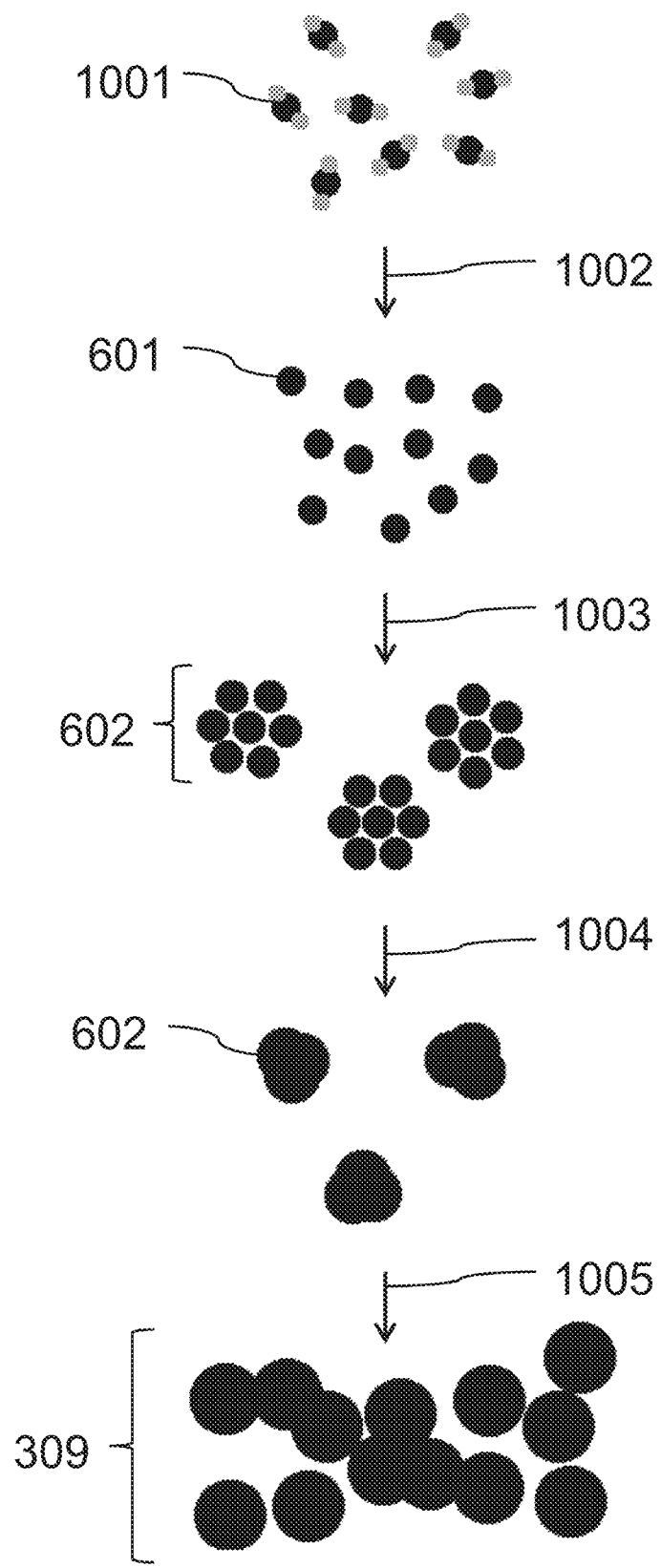
FIG. 10 illustrates a flow chart diagram further illustrating the process according to FIG. 1.

FIG. 10 illustrates a flow chart diagram illustrating the process 100 according to FIG. 1 further. The precursor 1001 is included by the feed material composition which is fed into the reaction zone 305 in process step a) 101 of the process 100. In accordance with FIG. 1, the precursor 1001 is OMCTS and the feed material composition further includes oxygen and hydrogen. By thermal decomposition 1002 of the precursor 1001, which according to FIG. 1 is a hydrolysis reaction, the plurality of primary particles 601 is obtained in process step b) 102. The primary particles 601 are silicon oxide particles. Further, the primary particles 601 agglomerate (agglomeration 1003), thereby forming the secondary particles 602, also referred to as agglomerates 602. The term first plurality of particles is used as a generic term which includes the primary particles 601 as well as the secondary particles 602 in the context of one embodiment. The secondary particles 602 are deposited on the substrate surface 302 of the substrate 301 in the process step c) 103. On the substrate surface 302 the secondary particles 602 are partially sintered (sintering 1004). Thereby, sintering necks 603 connecting the secondary particles 602 to each other are formed. Subsequently or overlapping in time the porous silicon dioxide material 309 of SiO₂ is formed as one layer on the substrate surface 302 (layer formation 1005). The further process steps are described in the context of the FIGS. 1 and 4.

Figure 11:
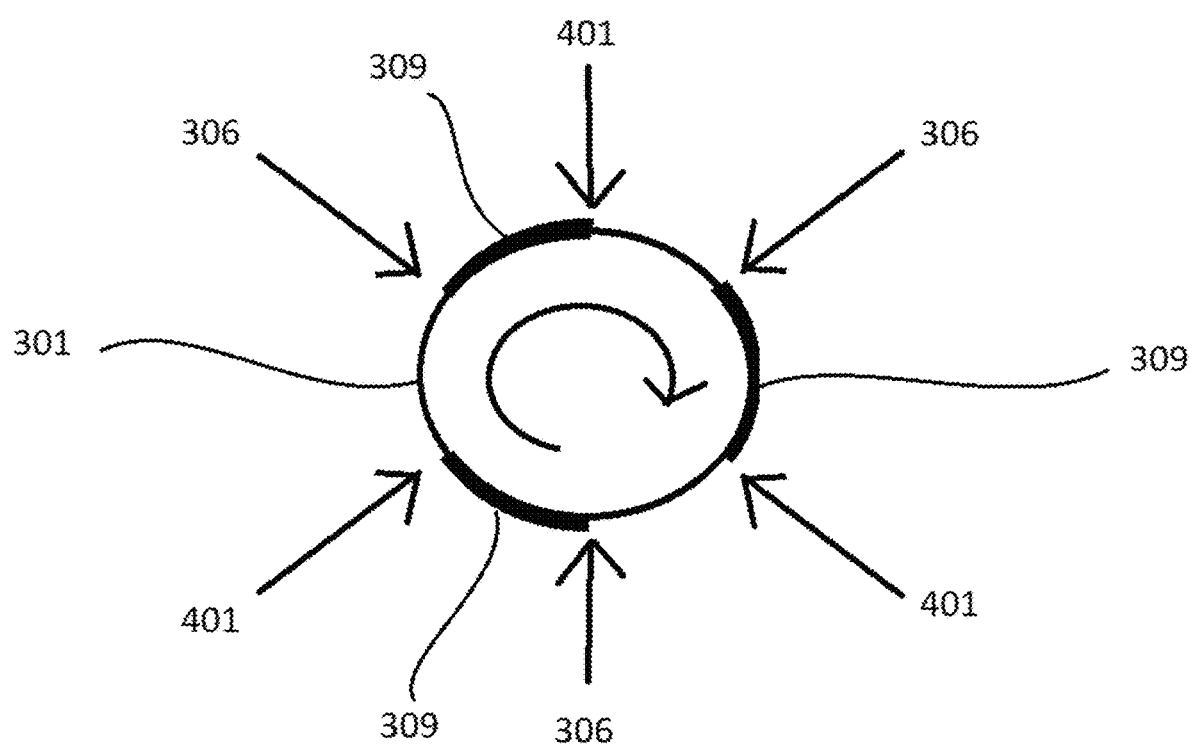
FIG. 11 illustrates a schematic diagram illustrating three deposition points and three removal points on a single substrate surface

FIG. 11 illustrates a setup for performing the process 100 in FIG. 1. Silicon dioxide is deposited onto a moving substrate surface 301 from 3 feed burners 306 to provide a porous silicon dioxide material 309. An air-blower 401 is arranged following each feed burner 306 in the direction of travel of the substrate surface 301 for removing the deposited porous silicon dioxide material 309. In this arrangement, only one layer of silicon dioxide is ever deposited onto the substrate surface, since deposited porous silicon dioxide material 309 is removed from the substrate surface 301 by the air blowers 401 before the substrate surface 301 reaches the subsequent deposition point 306.

Although specific embodiments have been illustrated and described herein, it will be appreciated by those of ordinary skill in the art that a variety of alternate and/or equivalent implementations may be substituted for the specific embodiments illustrated and described without departing from the scope of the present embodiments. This application is intended to cover any adaptations or variations of the specific embodiments discussed herein. Therefore, it is intended that these embodiments be limited only by the claims and the equivalents thereof.

What is claimed is:

1. A production process for making a porous silicon dioxide material comprising:
 a. feeding a feed material composition into a reaction zone at a feeding position, wherein the feed material composition is liquid or gaseous or both;
 b. reacting the feed material composition in the reaction zone into a first plurality of particles by a chemical reaction;
 c. depositing the first plurality of particles onto a substrate surface of a substrate, thereby obtaining a porous silicon dioxide material, having a pore structure, in the form of up to 20 layers superimposing the substrate surface;
 d. at least partially removing the porous silicon dioxide material from the substrate surface; and
 e. modifying the pore structure of the porous silicon dioxide material, thereby obtaining the porous silicon dioxide material having a further pore structure, wherein modifying the pore structure comprises a thermal treatment of the porous silicon dioxide material and;
 wherein the thermal treatment satisfies at least one of the following:
 a. the maximum temperature in the thermal treatment is higher than the maximum temperature of the substrate surface reached in a) to e);
 b. the thermal treatment comprises:
  i. increasing the temperature of the porous silicon dioxide material to a temperature in the range from 1100 to 1400° C.,
  ii. holding the temperature of the porous silicon dioxide material at a temperature in the range from 1100 to 1400° C. for a duration in the range from 100 to 2000 min, and
  iii. decreasing the temperature of the porous silicon dioxide material below 1000° C.; and
 c. the temperature of the removed porous silicon dioxide material is increased at a rate in the range from 2 to 10° C./min in the thermal treatment.

2. The process according to claim 1, further comprising:
 a. contacting the porous silicon dioxide material with a carbon source;
 b. at least partially carbonising the carbon source, thereby obtaining a precursor comprising the porous silicon dioxide material and carbon; and
 c. at least partially removing the porous silicon dioxide material from the precursor, thereby obtaining a porous carbon product.

* * * * *